(12) United States Patent
Takahira et al.

(10) Patent No.: US 11,216,909 B2
(45) Date of Patent: *Jan. 4, 2022

(54) INFORMATION PROCESSING APPARATUS, STORAGE MEDIUM, AND IMAGE OUTPUT SYSTEM

(71) Applicants: Tomoyuki Takahira, Kanagawa (JP); Akio Ishida, Tokyo (JP)

(72) Inventors: Tomoyuki Takahira, Kanagawa (JP); Akio Ishida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 10 days.

This patent is subject to a terminal disclaimer.

(21) Appl. No.: 16/782,443

(22) Filed: Feb. 5, 2020

(65) Prior Publication Data

US 2020/0175649 A1    Jun. 4, 2020

Related U.S. Application Data

(63) Continuation of application No. 15/717,082, filed on Sep. 27, 2017, now Pat. No. 10,593,017.

(30) Foreign Application Priority Data

Sep. 29, 2016 (JP) .............................. JP2016-191100
Aug. 10, 2017 (JP) .............................. JP2017-155889

(51) Int. Cl.
*G06T 3/40* (2006.01)
*G06T 1/00* (2006.01)
(Continued)

(52) U.S. Cl.
CPC .......... *G06T 3/4038* (2013.01); *G06T 1/0007* (2013.01); *G06T 3/0056* (2013.01);
(Continued)

(58) Field of Classification Search
CPC ... G06T 3/4038; G06T 1/0007; G06T 3/0056; H04N 1/00209; H04N 1/32112
See application file for complete search history.

(56) References Cited

U.S. PATENT DOCUMENTS 5,155,836 A * 10/1992 Jordan ............. G01R 31/31912
703/23
6,674,439 B1 * 1/2004 Shin ..................... G06T 3/4092
345/501

(Continued)

FOREIGN PATENT DOCUMENTS

JP    2000043485 A    2/2000
JP    2002027229 A    1/2002
(Continued)

OTHER PUBLICATIONS

Non-Final Office Action dated Feb. 25, 2019 in U.S. Appl. No. 15/717,082.

(Continued)

*Primary Examiner* — Kevin Ky
(74) *Attorney, Agent, or Firm* — Harness, Dickey & Pierce, P.L.C.

(57) ABSTRACT

An information processing apparatus, connectable with an image output apparatus, includes circuitry to receive image data of an image from a memory, acquire information of an image placement region of the image output apparatus, the image placement region being variable depending on a type of the image output apparatus, and the image is to be output on the image placement region of the image output apparatus, generate an output image by placing the image within the image placement region based on the image data of the image to be output, and the image placement region of the image output apparatus, and transmit the generated output image to the image output apparatus.

18 Claims, 33 Drawing Sheets

(51) Int. Cl.
*G06T 3/00* (2006.01)
*H04N 1/00* (2006.01)
*H04N 1/32* (2006.01)
*G06T 11/60* (2006.01)

(52) U.S. Cl.
CPC ......... *G06T 11/60* (2013.01); *H04N 1/00209* (2013.01); *H04N 1/32112* (2013.01); *G06T 2200/24* (2013.01); *G06T 2200/32* (2013.01); *H04N 2201/0055* (2013.01); *H04N 2201/0068* (2013.01); *H04N 2201/325* (2013.01); *H04N 2201/3215* (2013.01); *H04N 2201/3229* (2013.01); *H04N 2201/3254* (2013.01)

(56) References Cited

U.S. PATENT DOCUMENTS

| | | | | |
|---|---|---|---|---|
| 9,398,233 | B2* | 7/2016 | Kyusojin | G16H 30/40 |
| 9,930,307 | B1* | 3/2018 | Kursula | H04N 9/3147 |
| 2003/0025693 | A1* | 2/2003 | Haley | G06F 9/451 |
| | | | | 345/418 |
| 2004/0105113 | A1 | 6/2004 | Ishida et al. | |
| 2004/0249936 | A1 | 12/2004 | Ishida | |
| 2006/0209316 | A1 | 9/2006 | Toda | |
| 2006/0257016 | A1* | 11/2006 | Shioi | H04N 13/139 |
| | | | | 382/154 |
| 2008/0180734 | A1 | 7/2008 | Ishida et al. | |
| 2008/0320406 | A1* | 12/2008 | Fukada | H04N 21/4316 |
| | | | | 715/766 |
| 2009/0003731 | A1 | 1/2009 | Nitta et al. | |
| 2010/0118115 | A1* | 5/2010 | Takahashi | H04N 21/854 |
| | | | | 348/24 |
| 2012/0218273 | A1* | 8/2012 | Tsai | G06T 11/60 |
| | | | | 345/467 |
| 2012/0287164 | A1* | 11/2012 | Koh | G06T 3/0012 |
| | | | | 345/667 |
| 2013/0129217 | A1* | 5/2013 | Gupta | G06K 9/325 |
| | | | | 382/182 |
| 2014/0067903 | A1* | 3/2014 | Saeteras | H04L 67/327 |
| | | | | 709/201 |
| 2014/0132817 | A1* | 5/2014 | Sahoo | H04N 5/23219 |
| | | | | 348/333.11 |
| 2014/0176798 | A1* | 6/2014 | Tanaka | H04N 21/4858 |
| | | | | 348/570 |
| 2015/0109342 | A1* | 4/2015 | Ohki | H04N 21/4826 |
| | | | | 345/660 |
| 2015/0172774 | A1* | 6/2015 | Taniuchi | H04N 21/47205 |
| | | | | 725/60 |
| 2015/0228088 | A1* | 8/2015 | Yoon | G09G 5/006 |
| | | | | 345/545 |
| 2015/0248870 | A1* | 9/2015 | Nagano | G06T 3/40 |
| | | | | 345/619 |
| 2016/0041386 | A1* | 2/2016 | Moreno | G06F 9/451 |
| | | | | 345/7 |
| 2016/0070509 | A1 | 3/2016 | Takahira | |
| 2016/0217408 | A1* | 7/2016 | Garrity | G06Q 10/06393 |
| 2016/0334963 | A1* | 11/2016 | Heo | G06F 3/04817 |
| 2017/0126689 | A1* | 5/2017 | Lloyd | H04L 61/1594 |
| 2017/0220587 | A1* | 8/2017 | Srinivasan | G06F 40/154 |
| 2017/0352303 | A1* | 12/2017 | Aurongzeb | G09G 5/373 |
| 2018/0034979 | A1* | 2/2018 | Aggarwal | H04N 1/0044 |
| 2018/0181851 | A1* | 6/2018 | Kimura | G06K 19/06 |

FOREIGN PATENT DOCUMENTS

| | | |
|---|---|---|
| JP | 2002084348 A | 3/2002 |
| JP | 2005-279097 A | 10/2005 |
| JP | 2006256141 A | 9/2006 |
| JP | 2006-330027 A | 12/2006 |
| JP | 2008-033280 A | 2/2008 |
| JP | 2010267270 A | 11/2010 |
| JP | 2014-044268 A | 3/2014 |

OTHER PUBLICATIONS

Final Office Action dated Jul. 5, 2019 in U.S. Appl. No. 15/717,082.
Notice of Allowance dated Nov. 6, 2019 in U.S. Appl. No. 15/717,082.
Japanese Office Action dated Apr. 13, 2021 for Japanese Patent Application No. 2017-155889.

\* cited by examiner

FIG. 4

OPERATION REGION INFORMATION MANAGEMENT TABLE 500

| TYPE OF APPARATUS | APPARATUS NAME | OPERATION REGION 1 | OPERATION REGION 2 | OPERATION REGION 3 | IMAGE RESOLUTION |
|---|---|---|---|---|---|
| PROJECTOR | PJX001 | - | - | - | 1024 × 768 |
| PROJECTOR | PJX002 | (1790, 0) (1920, 1200) | - | - | 1920 × 1200 |
| ELECTRONIC INFORMATION BOARD | IW00A | (0, 0) (130, 1200) | (130, 1050) (1790, 1200) | (1790, 0) (1920, 1200) | 1920 × 1200 |
| ELECTRONIC INFORMATION BOARD | IW00B | (0, 0) (130, 1080) | (1790, 0) (1920, 1080) | - | 1920 × 1080 |
| PRINTER | PRN001 | - | - | - | - |
| ⋮ | ⋮ | ⋮ | ⋮ | ⋮ | ⋮ |

FIG. 11
SELECTED IMAGE 
OUTPUT IMAGE 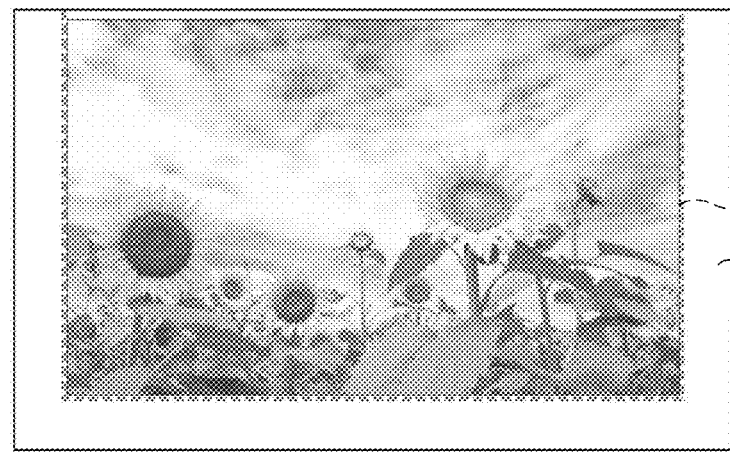

FIG. 12
SELECTED IMAGE 
 }m [SET BLANK]
 20XX/08/01 12:00 }m [ADD BIBLIOGRAPHIC INFORMATION]
OUTPUT IMAGE 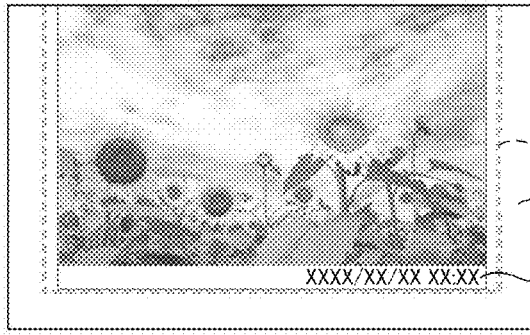 —R
—M
XXXX/XX/XX XX:XX— —20XX/08/01 12:00

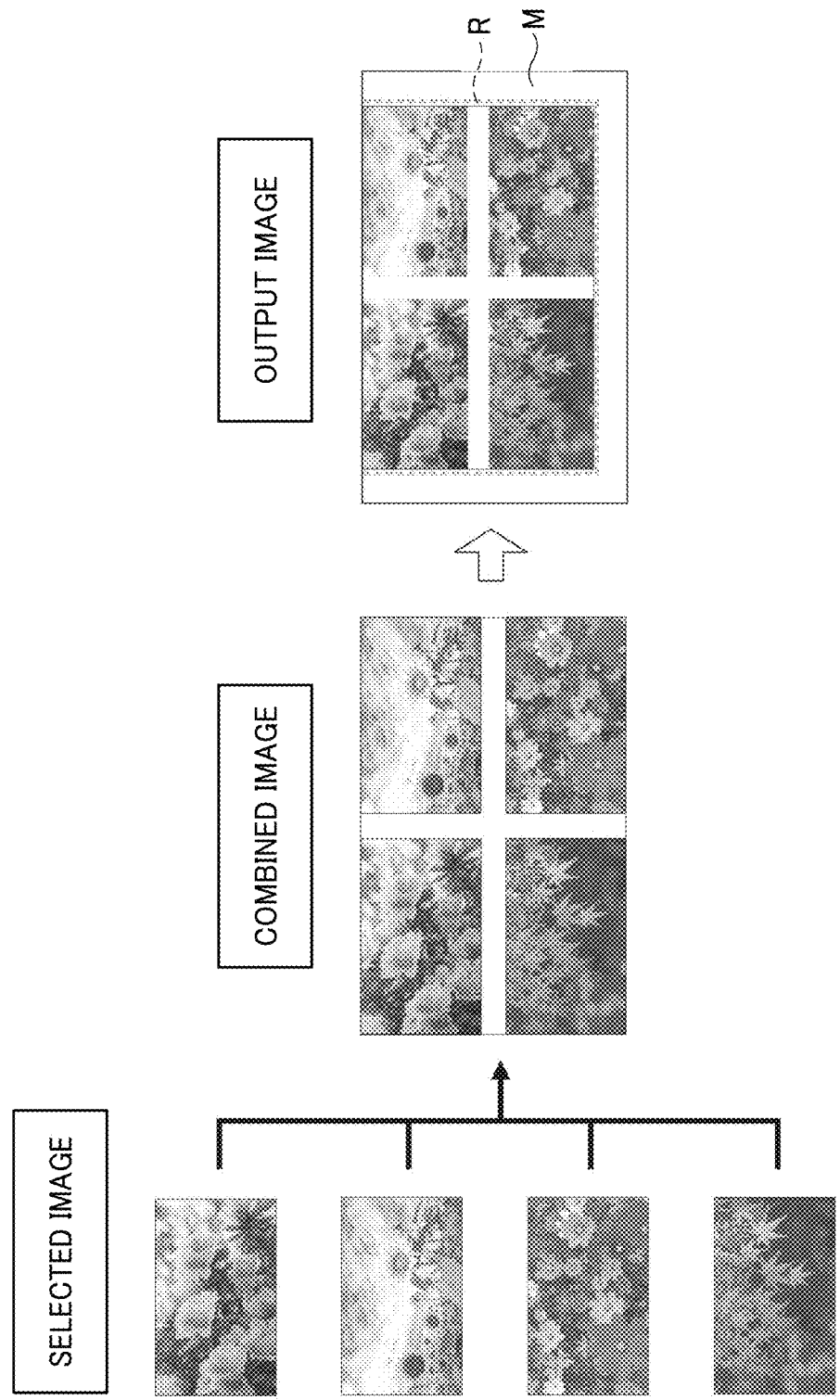

FIG. 19

DISPLAYABLE REGION INFORMATION MANAGEMENT TABLE

| TYPE OF APPARATUS | APPARATUS NAME | DISPLAY REGION SIZE | DISPLAY ORIENTATION |
|---|---|---|---|
| PROJECTOR | PJX001 | 1280 × 1024 | HORIZONTAL (LANDSCAPE) |
| PROJECTOR | PJX002 | 1920 × 1200 | HORIZONTAL (LANDSCAPE) |
| ELECTRONIC INFORMATION BOARD | IW00A | 1790 × 1200 | HORIZONTAL (LANDSCAPE) |
| ELECTRONIC INFORMATION BOARD | IW00B | 1920 × 1080 | HORIZONTAL (LANDSCAPE) |
| PRINTER | PRN001 | 4760 × 6815 | VERTICAL (PORTRAIT) |
| ... | ... | ... | ... |

INFORMATION PROCESSING APPARATUS, STORAGE MEDIUM, AND IMAGE OUTPUT SYSTEM

CROSS-REFERENCE TO RELATED APPLICATIONS

This application is a Continuation of U.S. application Ser. No. 15/717,082, filed on Sep. 27, 2017, which claims priority pursuant to 35 U.S.C. § 119(a) to Japanese Patent Application Nos. 2016-191100, filed on Sep. 29, 2016, and 2017-155889, filed on Aug. 10, 2017 in the Japan Patent Office, the disclosure of each of which is incorporated by reference herein in their entirety.

BACKGROUND

Technical Field

This disclosure relates to an information processing apparatus, a storage medium, and an image output system.

Background Art

Along with the spread of smart devices (e.g., smart phones, tablet PC), persons carry and use smart devices storing image data in various locations such as offices, and use various image output devices placed at the various locations to output image data stored in the smart devices as images.

For example, the image data can be output by using image output apparatuses such as electronic information boards, projectors, and multi-function peripherals (MFPs).

SUMMARY

In one aspect of the present invention, an information processing apparatus, connectable with an image output apparatus, is devised. The information processing apparatus includes circuitry to receive image data of an image from a memory, acquire information of an image placement region of the image output apparatus, the image placement region being variable depending on a type of the image output apparatus, and the image is to be output on the image placement region of the image output apparatus, generate an output image by placing the image within the image placement region based on the image data of the image to be output, and the image placement region of the image output apparatus, and transmit the generated output image to the image output apparatus.

In another aspect of the present invention, a non-transitory storage medium storing one or more instructions that, when executed by one or more processors, cause the one or more processors to execute an information processing method is devised. The method includes, receiving image data of an image from a memory, acquiring information of an image placement region of an image output apparatus, the image placement region being variable depending on a type of the image output apparatus, and the image is to be output on the image placement region of the image output apparatus, generating an output image by placing the image within the image placement region based on the image data of the image to be output, and the image placement region of the image output apparatus, and transmitting the generated output image to the image output apparatus.

In another aspect of the present invention, an image output system is devised. The image output system includes an image output apparatus, and an information processing apparatus connectable with the image output apparatus. The information processing apparatus includes circuitry to receive image data of an image from a memory, acquire information of an image placement region of the image output apparatus, the image placement region being variable depending on a type of the image output apparatus, and the image is to be output on the image placement region of the image output apparatus, generate an output image by placing the image within the image placement region based on the image data of the image to be output, and the image placement region of the image output apparatus, and transmit the generated output image to the image output apparatus. The image output apparatus includes circuitry to transmit information indicating the type of the image output apparatus to the information processing apparatus in response to an acquisition request of apparatus type information from the information processing apparatus, and output the output image received from the information processing apparatus.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 4 illustrates an example of an operation region information management table;

FIG. 11 illustrates a conceptual sequence of generating an output image;

FIG. 12 illustrates another conceptual sequence of generating an output image;

FIG. 14 illustrates another conceptual sequence of generating an output image;

FIG. 19 is an example of a displayable region information management table;

Figure 1:
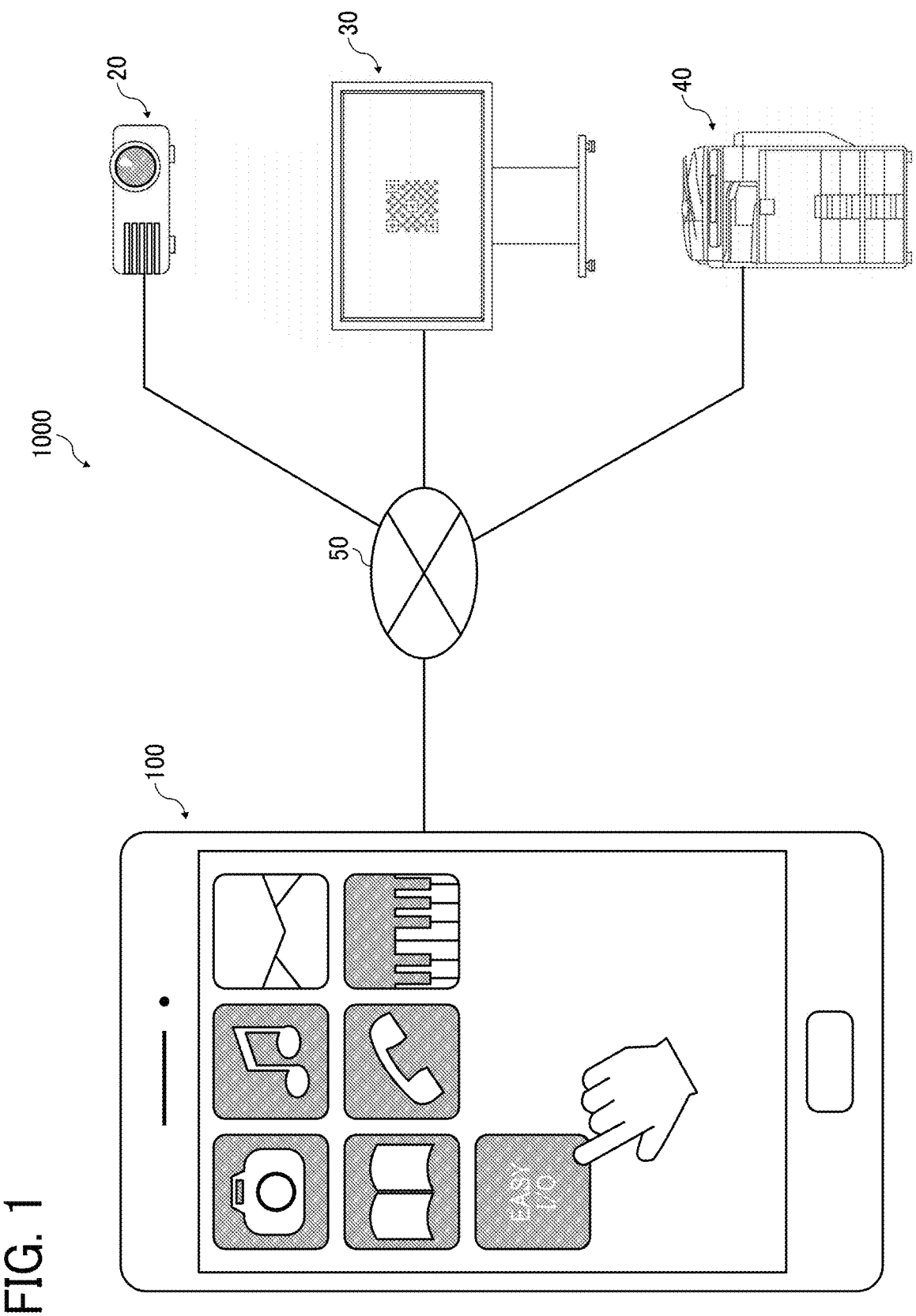
FIG. 1 is an example of a system configuration of an image output system of a first embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

Hereinafter, the present invention will be described with reference to embodiments, but the present invention is not limited to the embodiments described below. In the drawings referred to below, the same reference numerals are used for the common elements, and descriptions of the common elements will be omitted if redundant.

First Embodiment

FIG. 1 is an example of a system configuration of an image output system 1000 according to a first embodiment of the present invention. The image output system 1000 includes, for example, an information processing apparatus 100, and one or more image output apparatuses. In an example case illustrated in FIG. 1, the information processing apparatus 100 and each one of the image output apparatuses are communicably connected with each other via a network 50 such as a wireless local area network (LAN) and/or or a wired LAN. The communication system between the information processing apparatus 100 and each of the image output apparatuses is not limited to the LAN. For example, the communication system between the information processing apparatus 100 and each of the image output apparatuses can be short-distance wireless communication such as Bluetooth (registered trademark) and NFC (registered trademark), an optical communication, and a ultrasonic communication, but not limited thereto.

The information processing apparatus 100 can be used to transmit image data (hereinafter, image data may be also referred to as image or image contents) to the image output apparatus via the network 50 to output the image data by using the image output apparatus. The information processing apparatus 100 is, for example, a smart device such as a smartphone and a tablet personal computer (PC), but not limited thereto. In the embodiment, the information processing apparatus 100 is not limited to the smart device, but the information processing apparatus 100 can be a note PC, a desktop PC and the like. In this description, the information processing apparatus 100 is assumed as the smart device, but not limited thereto.

The image output apparatus can be used to receive image data from the information processing apparatus 100 via the network 50. In an example configuration illustrated in FIG. 1, the image output apparatus is, for example, a projector 20 that projects image data onto a screen, an electronic information board 30 that displays image data on a display, and a multifunctional apparatus 40 that prints image data on a sheet.

Figure 2:
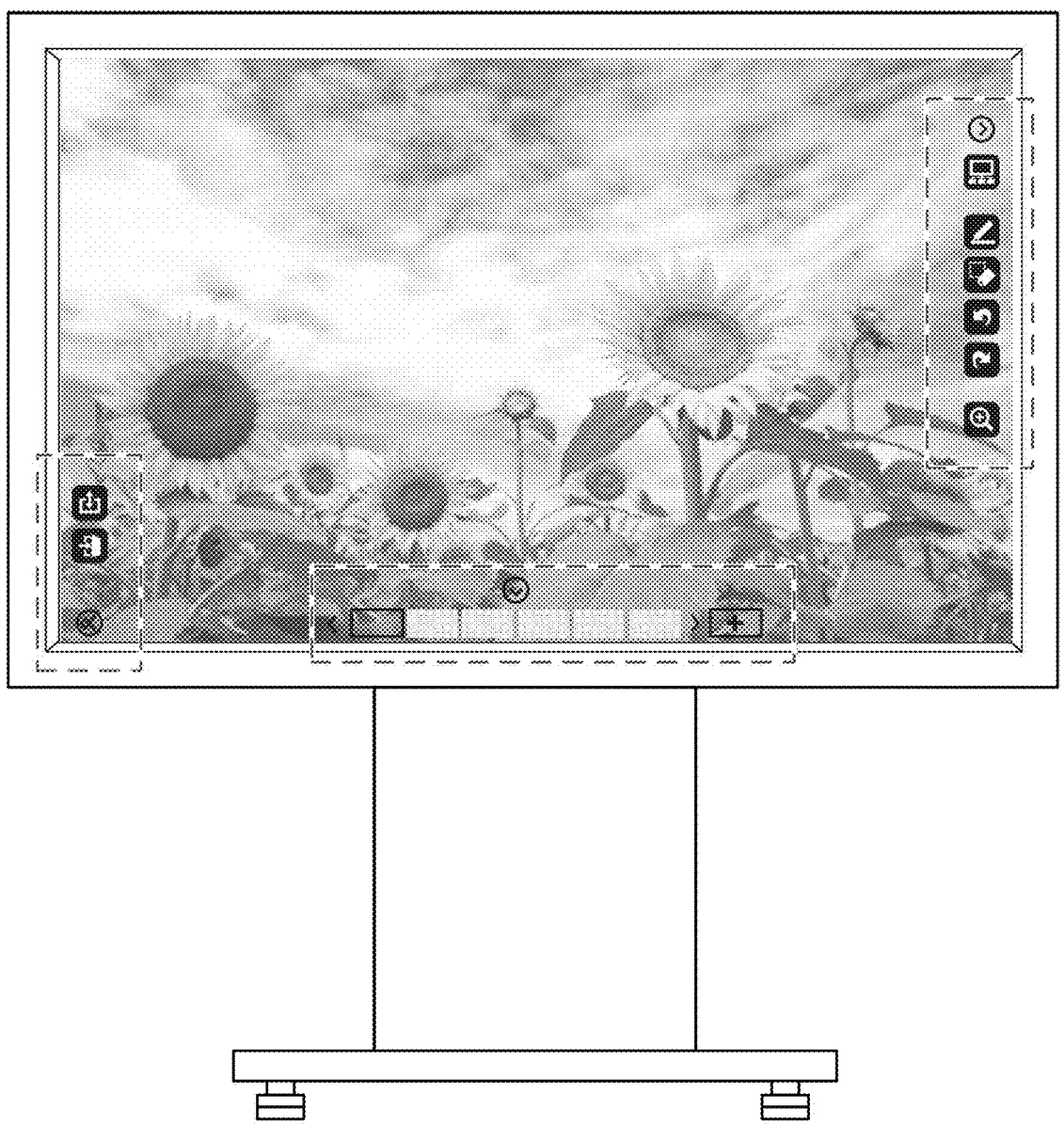
FIG. 2 illustrates an example of conventional electronic information board that displays operation buttons on a display.

The system configuration of the image output system 1000 is described above. When an image output apparatus displays icon of the operation buttons on a display screen of the image output apparatus, the operation buttons are superimposed and displayed on image contents, with which the visibility of image contents and icons of the operation buttons may deteriorate. FIG. 2 illustrates an example of a display screen of a conventional electronic information board that displays operation buttons (e.g., icons) and image contents. In this conventional case, a part of image displayed on the display screen is overlapped by a group of operation buttons, indicated by broken lines, with which visibility of both of the image and the operation buttons displayed on the display screen deteriorate.

Figure 3:
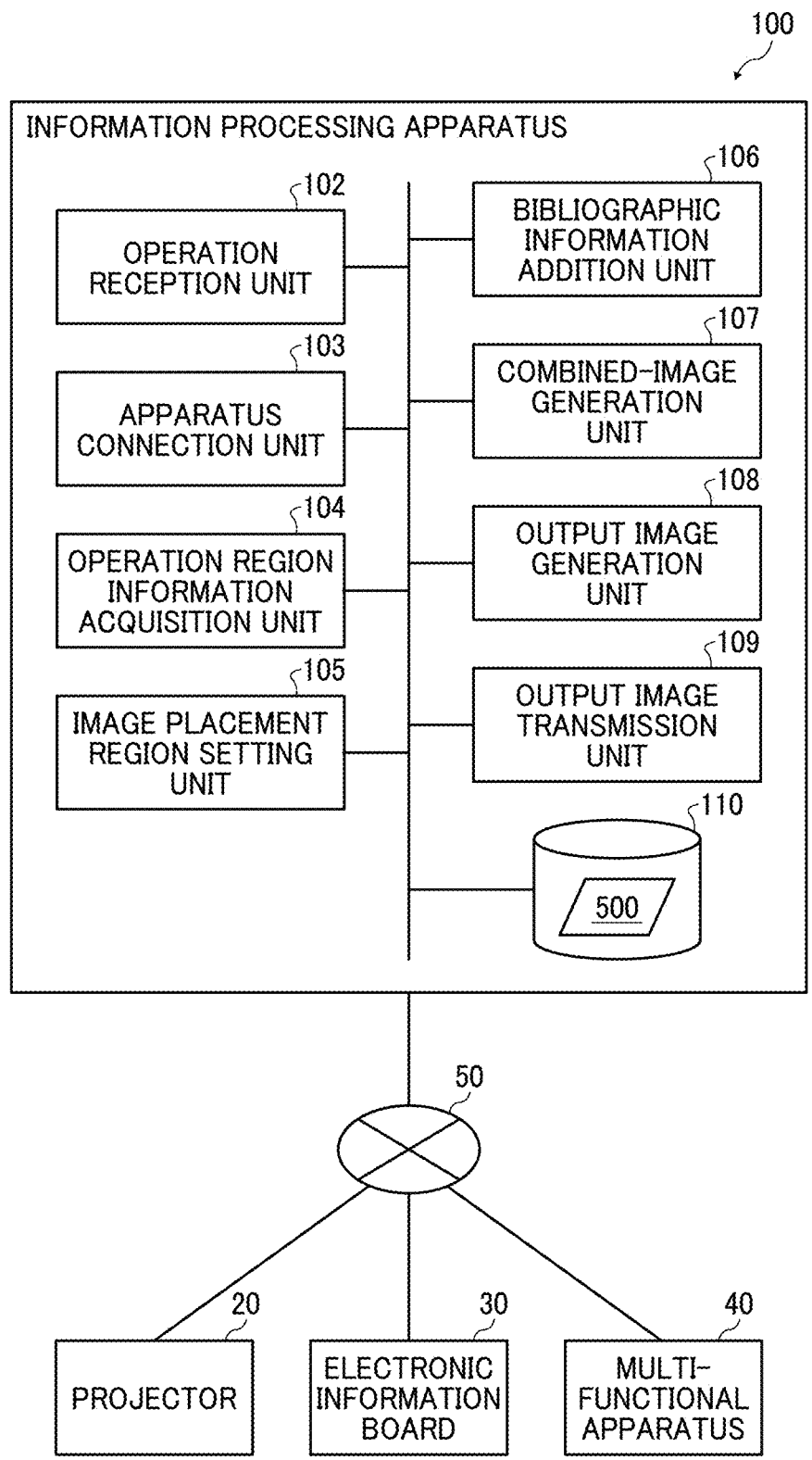
FIG. 3 is an example of a functional block diagram of the information processing apparatus of the first embodiment.

Therefore, this disclosure describes a technique of adjusting the size or the like of a to-be-displayed image to reduce or suppress deterioration of the visibility of image on the display screen. FIG. 3 is an example of a functional block diagram of the information processing apparatus 100 of the first embodiment. Hereinafter, a functional configuration of the information processing apparatus 100 (e.g. smart device) is described with reference to the functional block diagram of FIG. 3.

As illustrated in FIG. 3, the information processing apparatus 100 includes, for example, an operation reception unit 102, an apparatus connection unit 103, an operation region information acquisition unit 104, an image placement region setting unit 105, a bibliographic information addition unit 106, a combined-image generation unit 107, an output image generation unit 108, an output image transmission unit 109, and a storage unit 110.

The operation reception unit 102 receives various operations from a user such as a selection of the image output apparatus used as an output destination, a selection of to-be-output image data, and a setting of output condition of image data.

The apparatus connection unit 103 establishes a communication connection between the information processing apparatus 100 and the image output apparatus.

The operation region information acquisition unit 104 acquires operation region information indicating a position of an operation region that is set in a total image-outputting area of the image output apparatus such as the projector 20, the electronic information board 30, and the multifunctional apparatus 40.

The image placement region setting unit 105 sets a region that does not overlap the operation region indicated by the operation region information in the total image-outputting area as an image placement region. Therefore, the total image-outputting area includes the operation region and the image placement region as mutually exclusive regions that do not overlap with each other.

The bibliographic information addition unit 106 allocates or sets a blank for a selected image, and adds bibliographic information in the blank. The blank can be also referred to as the blank section.

The combined-image generation unit 107 generates a combined image, which is generated by combining two or more selected images.

The output image generation unit 108 reduces a size of the selected image to generate a size-reduced image, and then generates an output an image that places the size-reduced image within the image placement region.

The output image transmission unit 109 transmits the generated output image to the image output apparatus.

The storage unit 110 stores an operation region information management table 500 that correlates apparatus type information and operation region information of the image output apparatus, and manages the apparatus type information and the operation region information of the image output apparatus. The storage unit 110 stores the operation region information, for example, as the operation region information management table 500.

In the first embodiment, a computer employed for the information processing apparatus 100 is installed with a dedicated application program (hereinafter, dedicated application), and when the computer executes the dedicated application, each of the above described functions is implemented.

FIG. 4 is an example of the operation region information management table 500 stored in the storage unit 110. As illustrated in FIG. 4, the operation region information management table 500 includes, for example, fields 501, 502, 503, 504, 505, and 506 for storing information. Specifically, the field 501 is used to store information of type of the image output apparatus, the field 502 is used to store identification information (e.g., apparatus name) set for each of the image output apparatus, the fields 503, 504 and 505 are used to store the operation region information, and the field 506 is used to store information of the maximum image resolution of the image output apparatus. Further, when the image output apparatus has no settings of the operation region, the fields 503 to 505 in the operation region information management table 500 are set blank (i.e., no information).

In this disclosure, the operation region is, for example, a rectangular region that is set in the total image-outputting area of the image output apparatus, and the operation region is used for allocating or placing one or more operation buttons (e.g., icons). Typically, an apparatus such as an electronic information board and a projector are equipped with a pointing device, in which a plurality of operation buttons (e.g., icons) are displayed with a given arrangement pattern on a display or a screen, and a user operates the apparatus via each of the operation buttons. In this configuration, to prevent erroneous operation of the operation buttons by the pointing device, the pointing device is configured to receive an operation of the operation buttons alone, but not to receive actions not related to the operation of the operation buttons within the operation region.

In this disclosure, the operation region information means coordinate information indicating a position of one or more operation regions set in the total image-outputting area of the image output apparatus. In this disclosure, a pair of coordinate values, corresponding to both end points of the diagonal of the rectangular region used as the operation region, is stored in the fields 503 to 505 of the operation region information management table 500 as the coordinate information indicating a position of the operation region.

As above described, the information processing apparatus 100 employs the functional configuration illustrated in FIG. 3 for the first embodiment. Hereinafter, a description is given of processing that is performed by the information processing apparatus 100 with reference to FIG. 3 and other drawings.

Figure 5A:
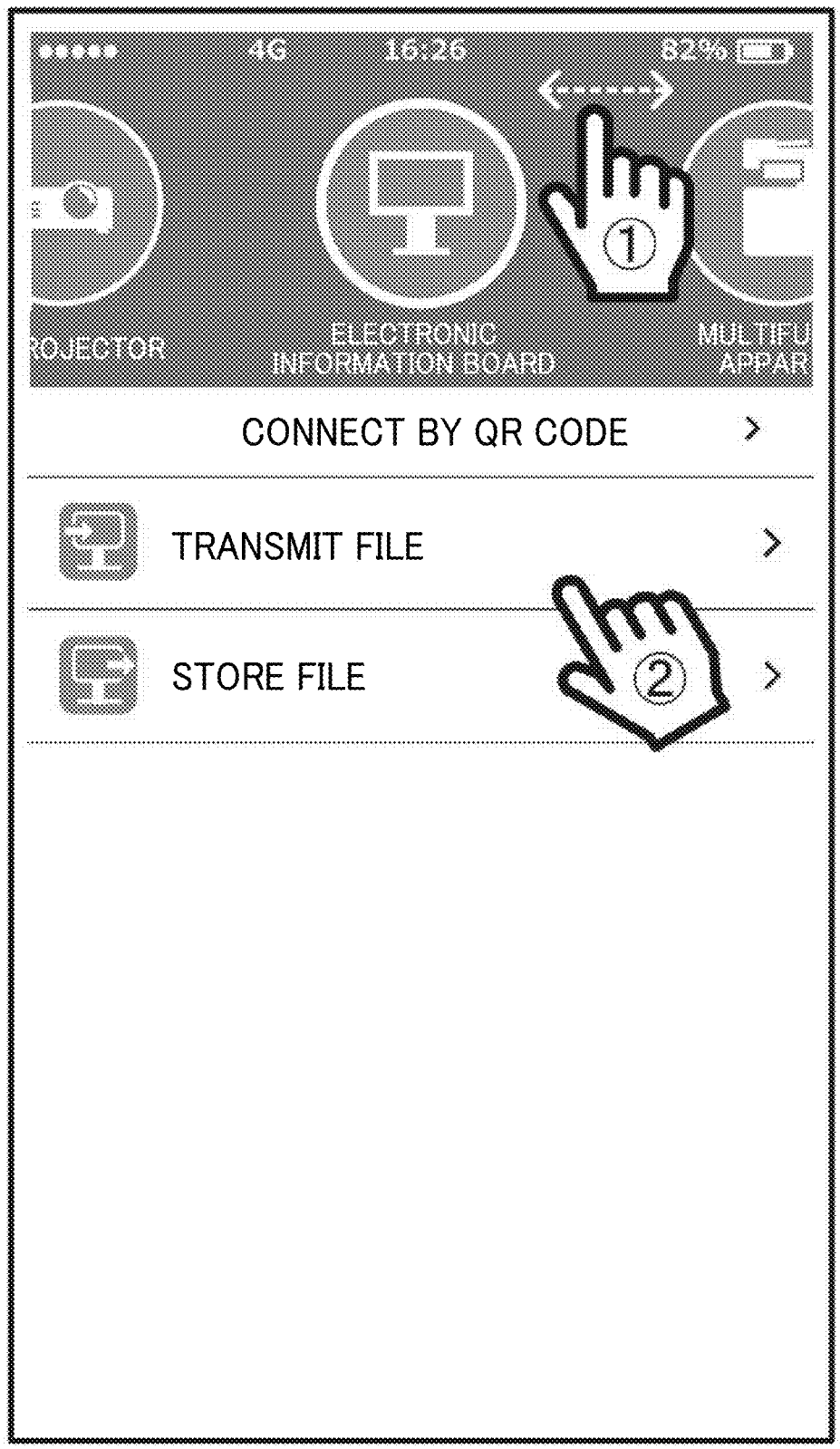
FIGS. 5A, 5B, and 5C illustrate examples of application screen.
Figure 5B:
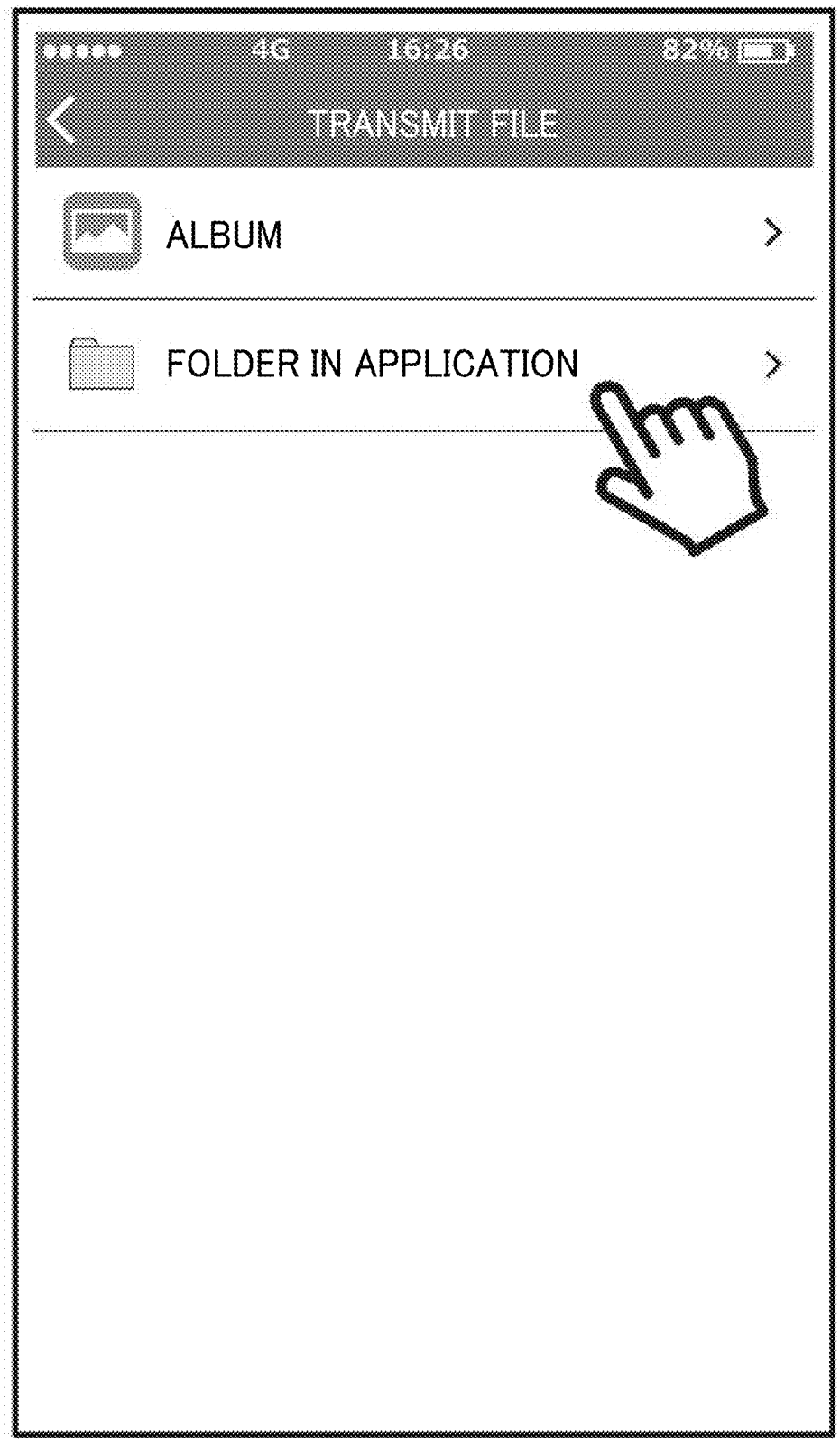

When a user taps an icon of "easy input/output (I/O)" displayed on a home screen (FIG. 1) of the information processing apparatus 100, the above described dedicated application is activated, and then the operation reception unit 102 displays an apparatus selection screen illustrated in FIG. 5A. In this example case, icons of the image output apparatuses (e.g., projector, electronic information board, multi-functional apparatus) are displayed at a top part of the apparatus selection screen as selectable apparatuses. When the user swipes an area displayed at the top part of the apparatus selection screen to left and right to display an icon of "electronic information board" at the center, "transmit file" and "store file" are displayed as selectable options. When the user taps "transmit file," the screen shifts to a file storage selection screen illustrated in FIG. 5B.

Figure 5C:
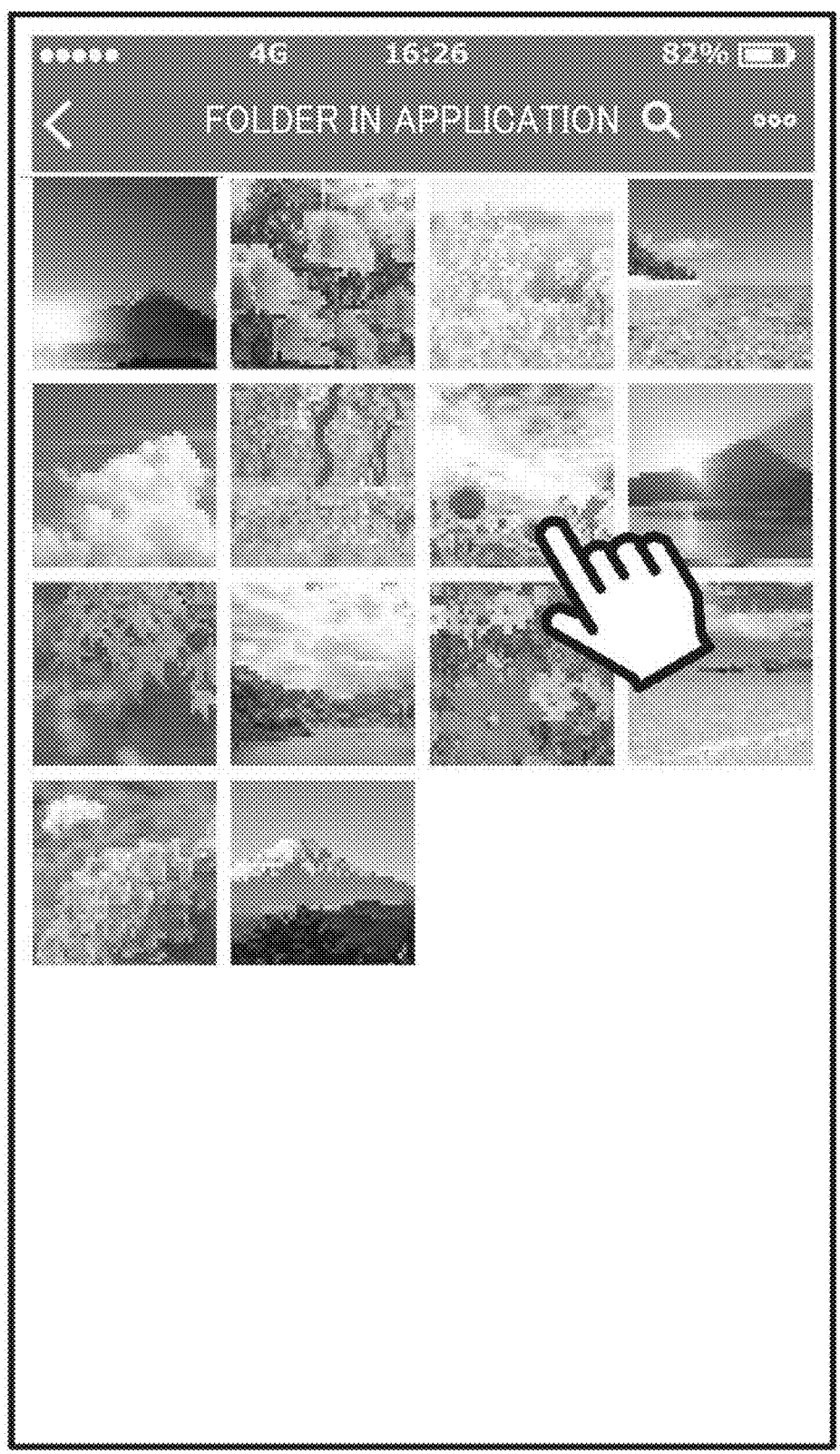

In this example case, the file storage selection screen displays "album" and "folder in application" as a file storage destination. When the user taps "folder in application," the screen shifts to a file selection screen illustrated in FIG. 5C. In this example case, the file selection screen displays a plurality of images stored in the folder in application as thumbnail images, which can be selected by the user.

Figure 6A:
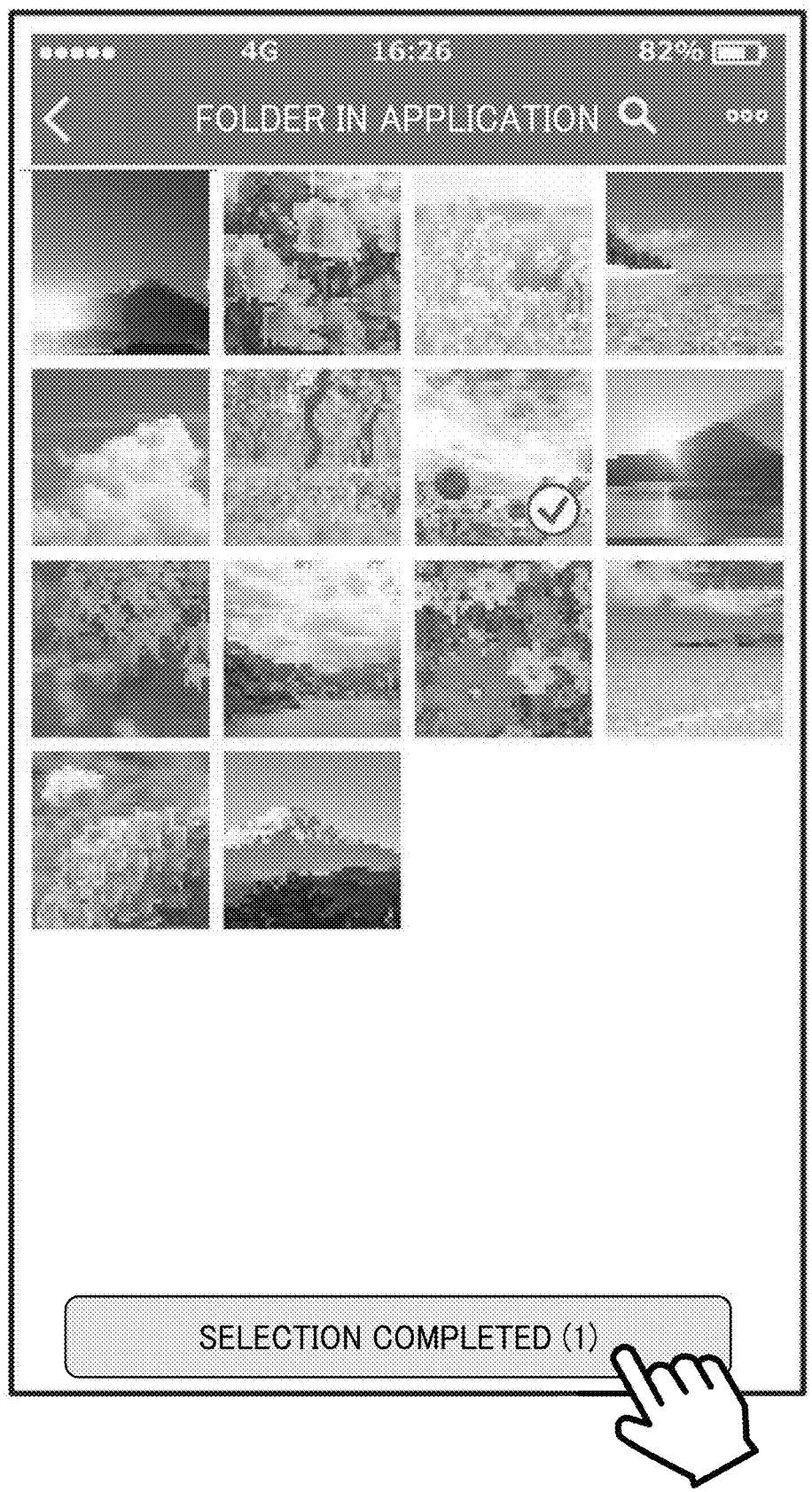
FIGS. 6A, 6B, and 6C illustrate examples of another application screen.
Figure 6B:
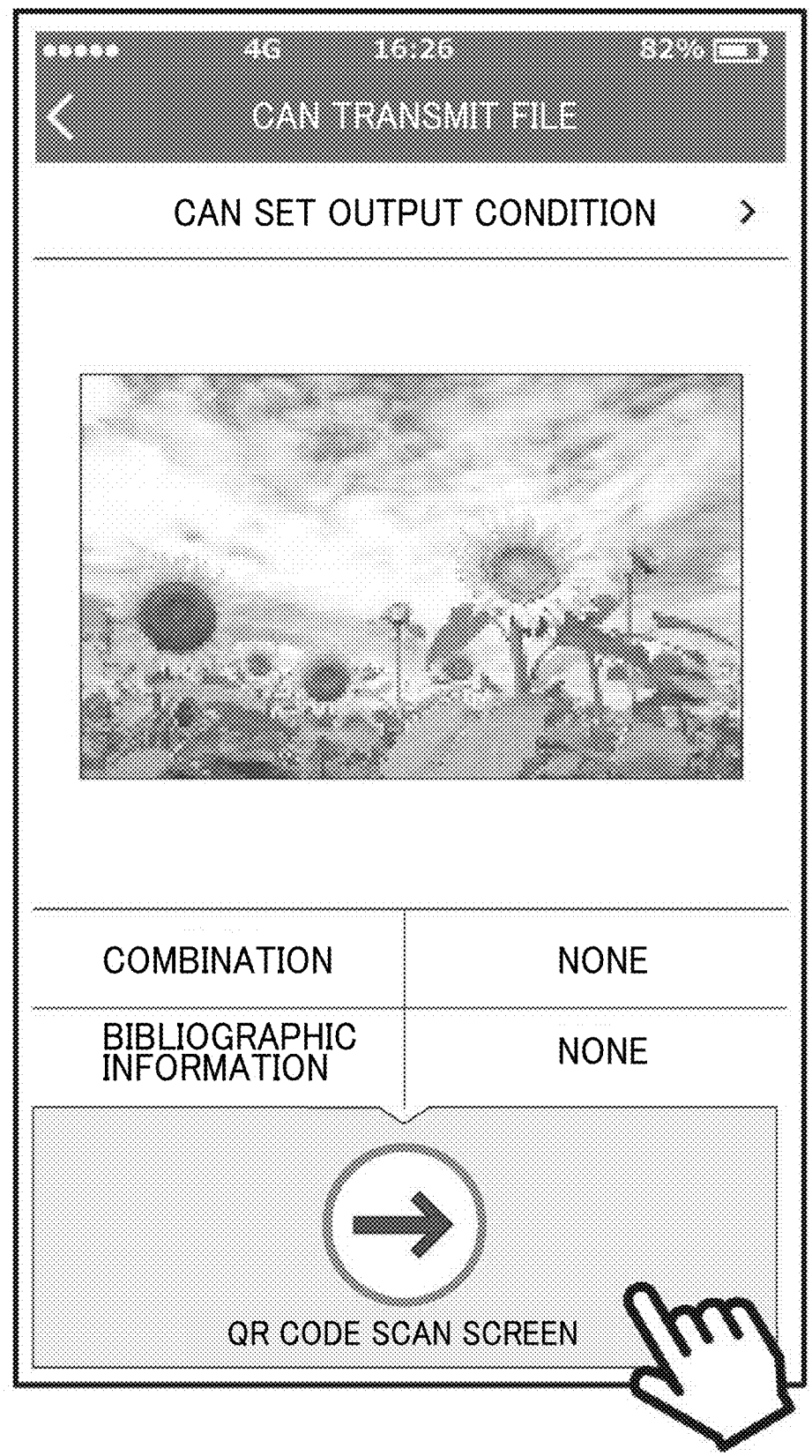
Figure 6C:
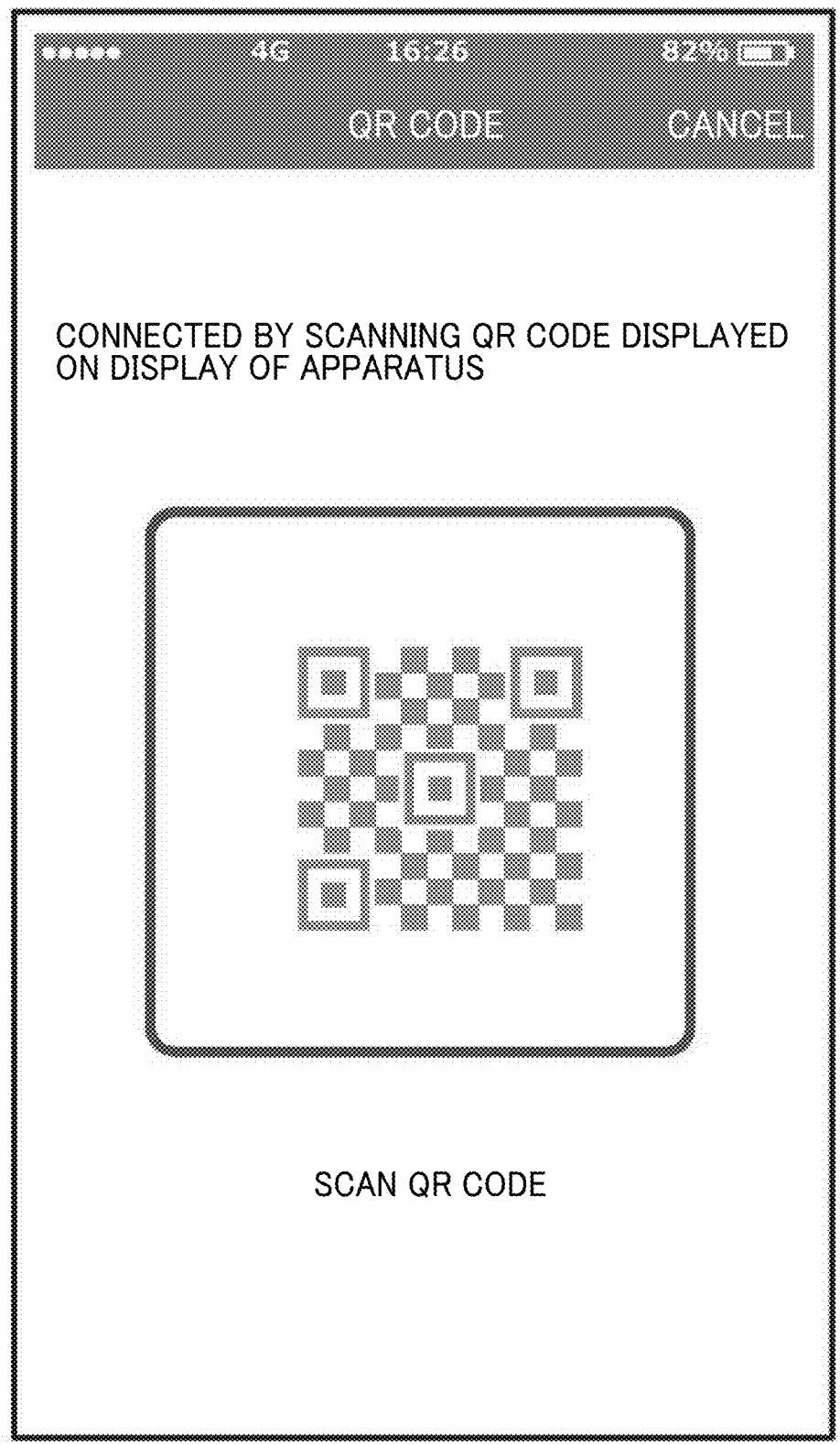

When the user selects, for example, one of the images, and then taps "selection completed" as illustrated in FIG. 6A, the screen shifts to an output condition setting screen illustrated in FIG. 6B. In the first embodiment, the user can perform combination setting and adding of bibliographic information (hereinafter, bibliographic information setting) via the output condition setting screen, and setting contents are displayed at the lower part of the preview as illustrated in FIG. 6B. In an example case of the output condition setting screen illustrated in FIG. 6B, the user selects the combination setting as "none" and bibliographic information setting as "none." When the user taps "QR code scan screen," a camera function of the information processing apparatus 100 is activated as a response to the tapping, and then the screen shifts to a QR code (registered trademark) scan screen illustrated in FIG. 6C.

Figure 7A:
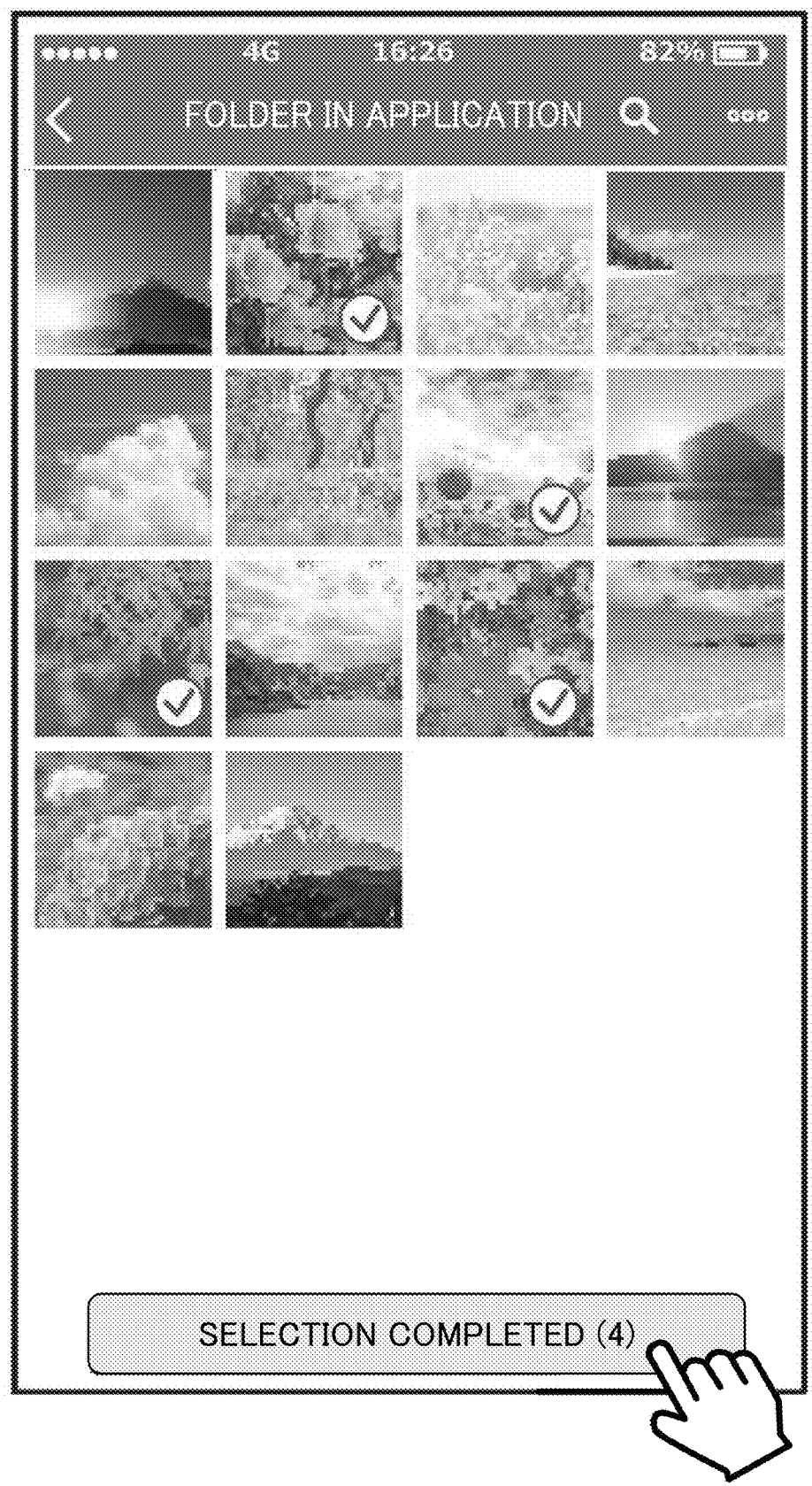
FIGS. 7A, 7B, and 7C illustrate examples of another application screen.
Figure 7B:
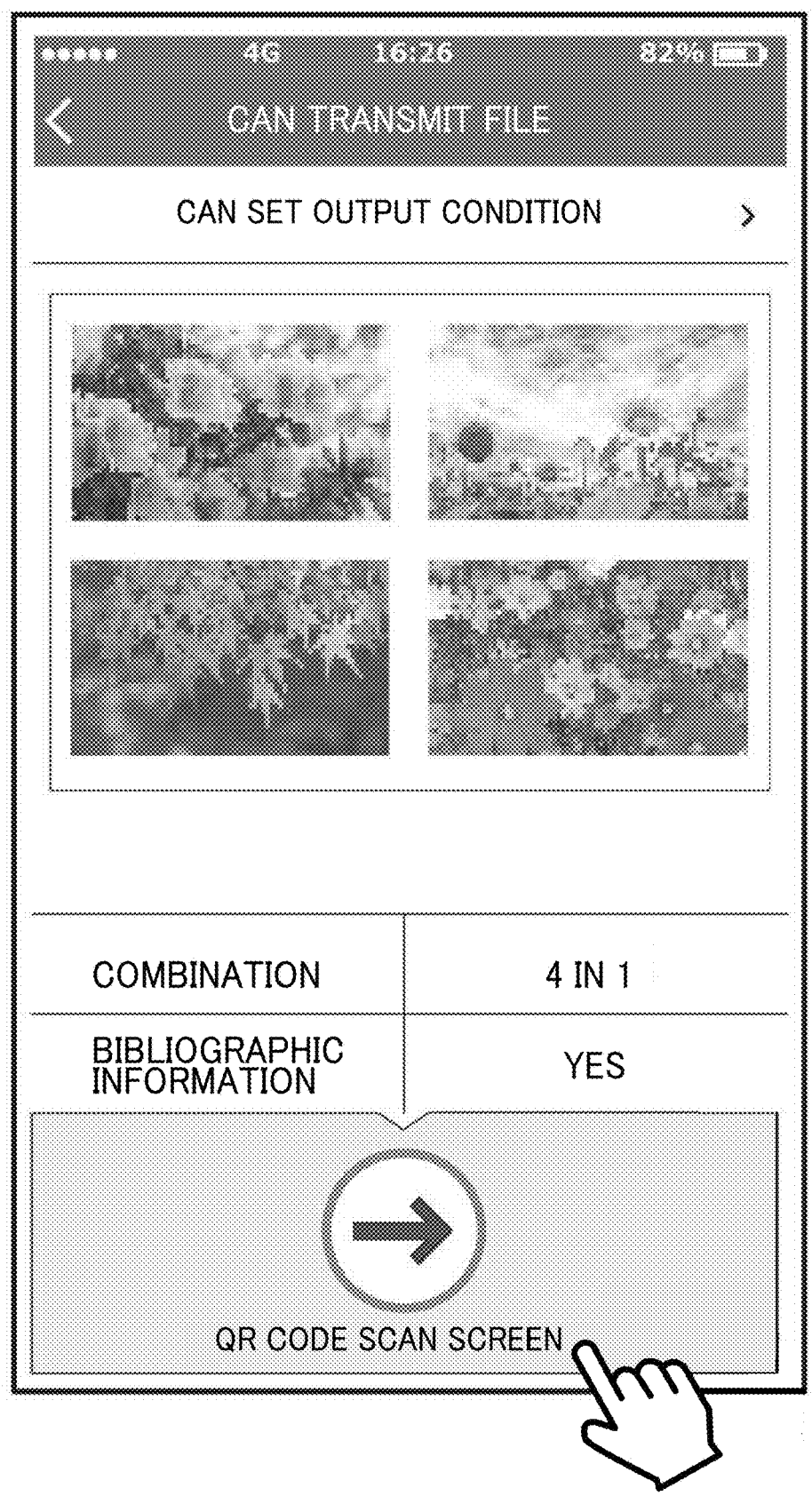
Figure 7C:
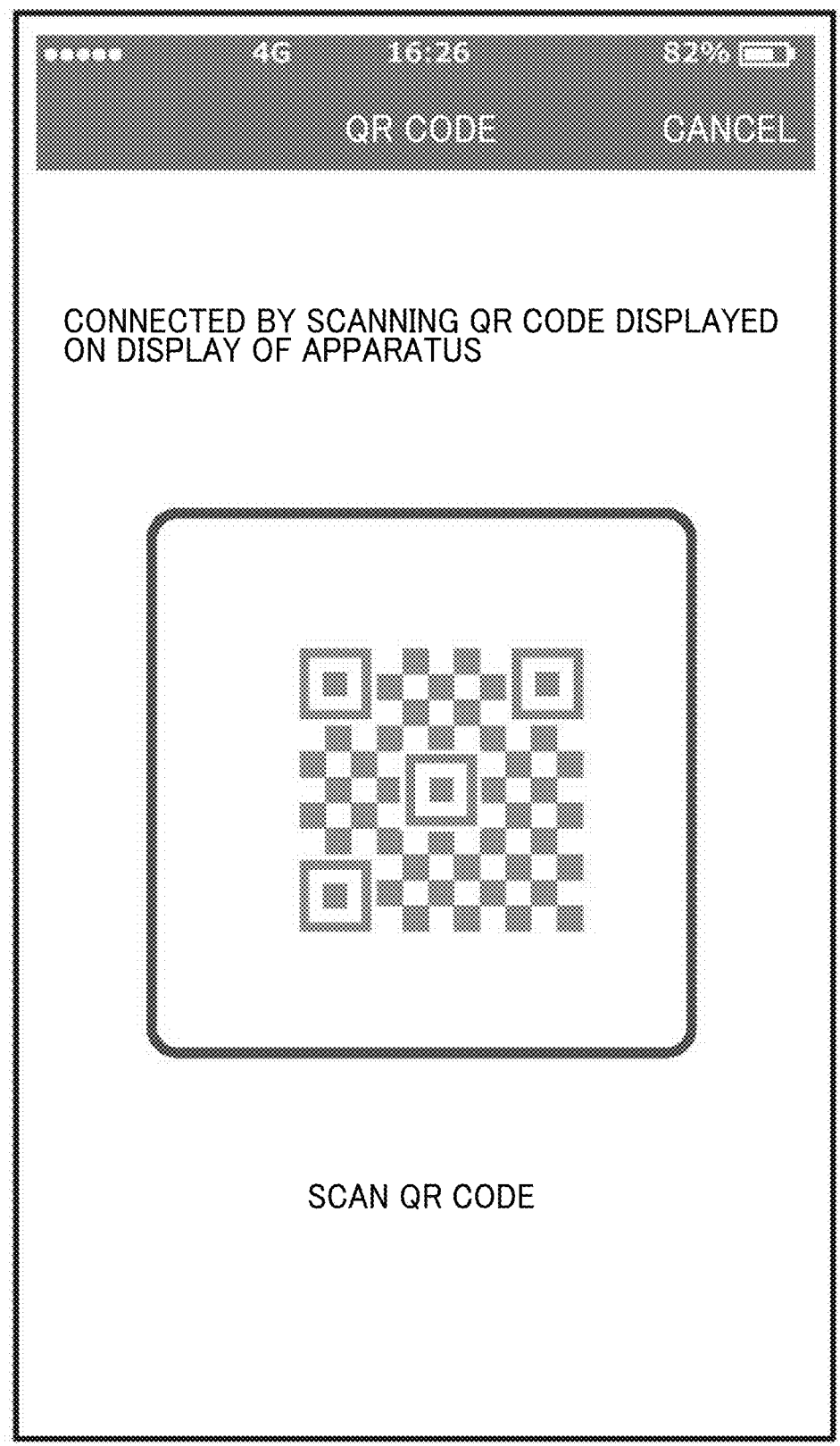

Further, FIG. 7A illustrate another example of the file selection screen when the user selects two or more images, and FIG. 7B illustrate another example of the output condition setting screen when the user selects the combination setting of "4 in 1" and bibliographic information setting of "YES." In this case too, when the user taps "QR code scan screen," the screen shifts to a QR code scan screen illustrated in FIG. 7C.

When the screen shifts to the QR code scan screen, and the information processing apparatus 100 scans a QR code displayed on a display of the electronic information board 30 that the user wants to connect with the information processing apparatus 100, the apparatus connection unit 103 analyzes connection information of the electronic information board 30 embedded in the QR code, and establishes communication between the information processing apparatus 100 and the electronic information board 30 based on the connection information.

Figure 8:
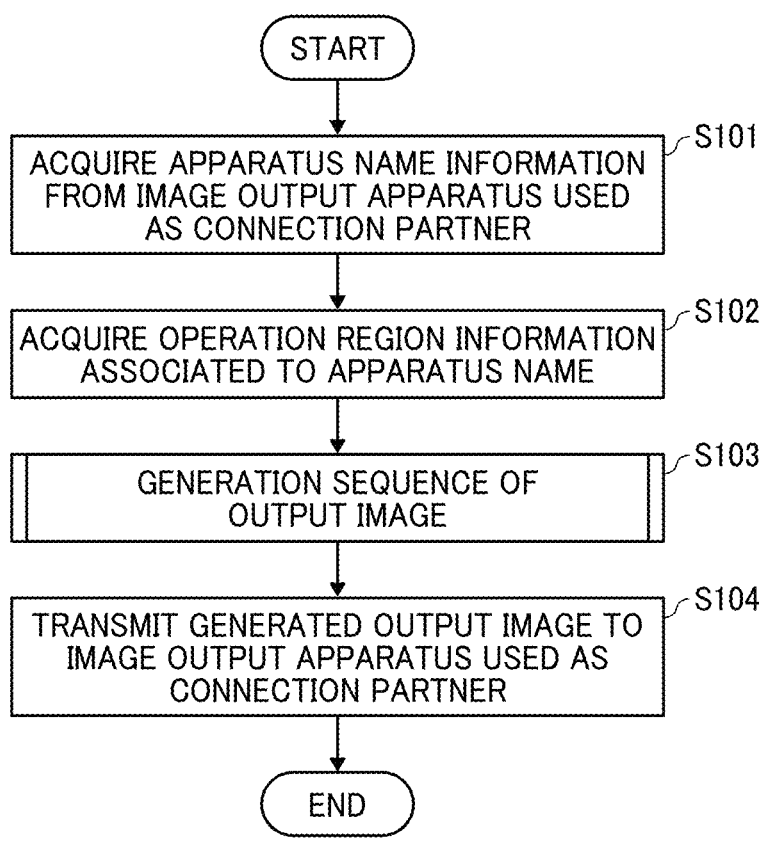
FIG. 8 is an example of a flow chart illustrating steps of a process performed by the information processing apparatus of the first embodiment.

When the communication between the information processing apparatus 100 and the electronic information board 30 is established, the information processing apparatus 100 starts a sequence of FIG. 8. FIG. 8 is an example of a flow chart illustrating steps of a process performed by the information processing apparatus 100.

At step S101, the operation region information acquisition unit 104 transmits an acquisition request of apparatus type information to the image output apparatus selected and used as the connection partner, and acquires apparatus type information of the image output apparatus such as apparatus name of the electronic information board 30. Hereinafter, it is assumed that "IW00A" is acquired as the apparatus name of the electronic information board 30.

Figure 10A:
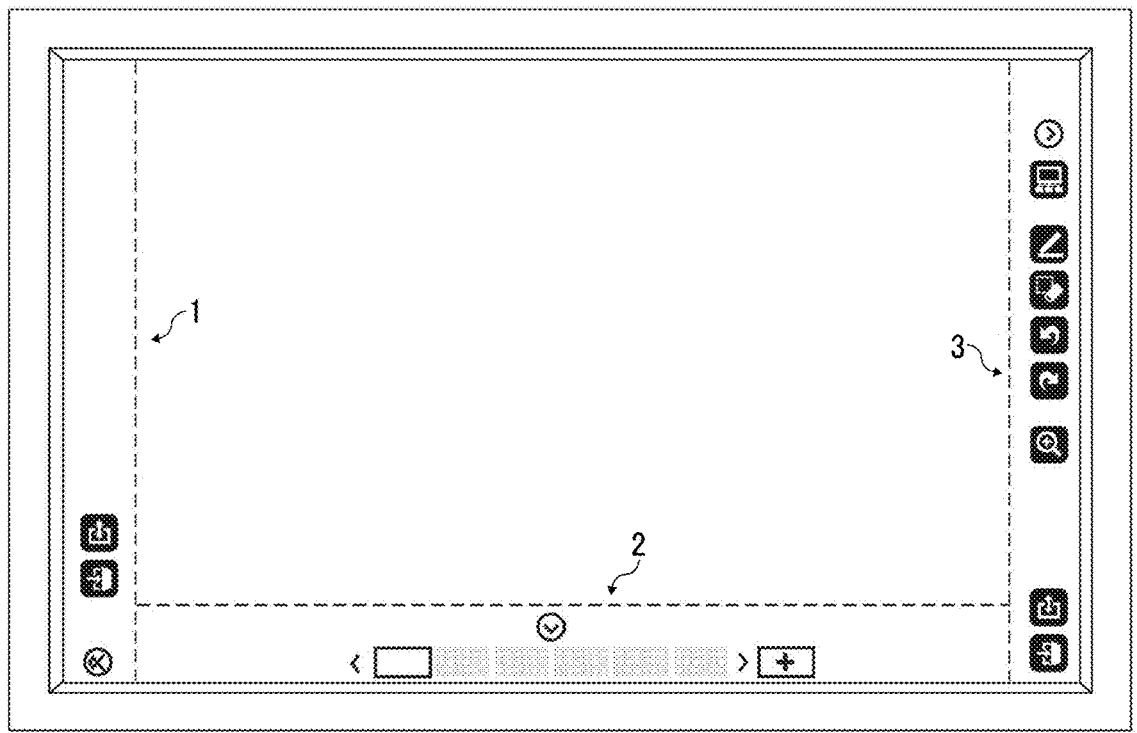
FIGS. 10A and 10B illustrate an example of a display set with an image placement region.

FIG. 10A illustrates an example of a display of the electronic information board 30 having the apparatus name of "IW00A." As illustrated in FIG. 10A, when the electronic information board 30 (IW00A) is used, three operation regions 1, 2 and 3 (hereinafter, first operation region 1, second operation region 2, third operation region 3) are set in the total image-outputting area of the electronic information board 30 (IW00A), and one or more operation buttons (e.g., icons) of the apparatus can be displayed in each of the first operation region 1, the second operation region 2, and the third operation region 3.

Then, at step S102, the operation region information acquisition unit 104 searches the operation region information management table 500 (FIG. 4) stored in the storage unit 110 by using the acquired apparatus name "IW00A" as a search key, and acquires the operation region information associated to the apparatus name "IW00A." In this example case, a pair of coordinate values of (0, 0) and (130, 1200) corresponding to both end points of the diagonal of the first operation region 1, a pair of coordinate values of (130, 1200) and (1790, 1050) corresponding to both end points of the diagonal of the second operation region 2, and a pair of coordinate values of (1790, 0) and (1920, 1200) corresponding to both end points of the diagonal of the third operation region 3 are acquired as the operation region information.

Then, at step S103, an "output image generation sequence" that generates an output image based on the acquired operation region information is performed.

Then, at step S104, the output image transmission unit 109 transmits the generated output image to the electronic information board 30 (IW00A) selected and used as the connection partner, and then the sequence ends.

Hereinafter, a description is given of detail of the "output image generation sequence" performed at step S103 with reference to FIG. 9, which is an example of a flow chart illustrating steps of a process of generating an output image.

At step S201, the image placement region setting unit 105 sets the image placement region based on the operation region information acquired at step S102 by performing the followings.

Figure 10B:
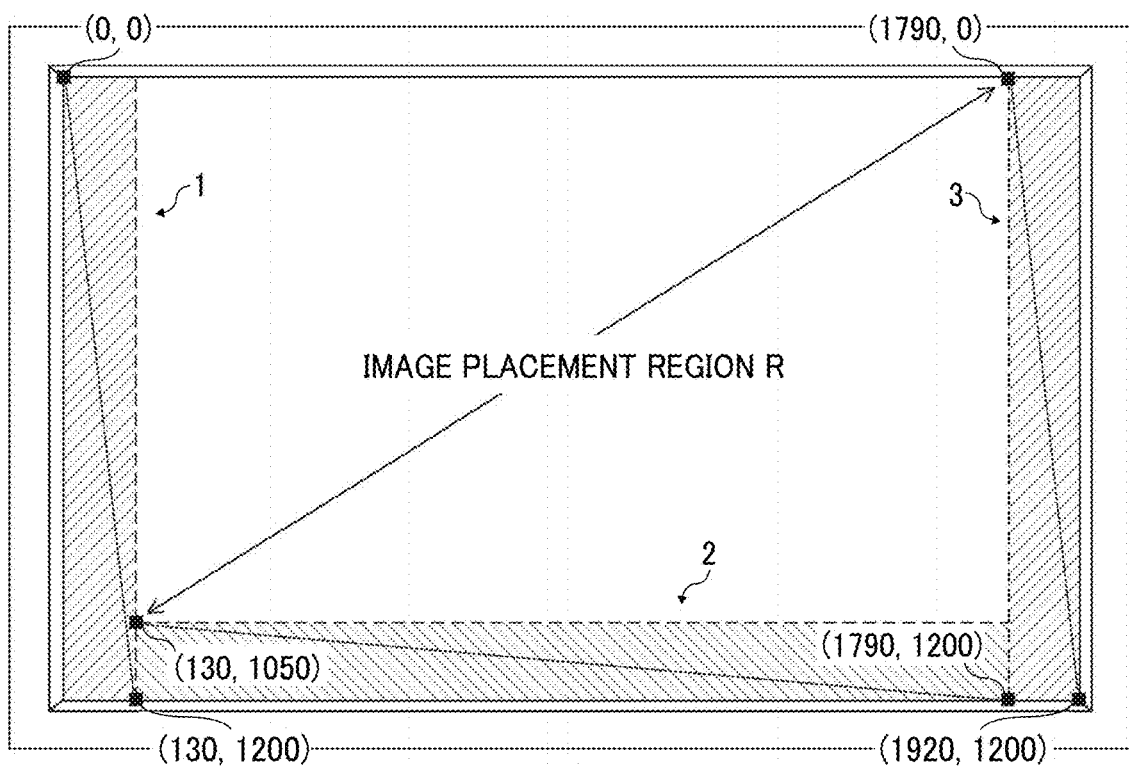

At step S201, as illustrated in FIG. 10B, a rectangular region having the diagonal connecting two pixel positions indicated by the pair of coordinate values, acquired at step S102, is set as the operation region in the total image-outputting area of the electronic information board 30. Specifically, a rectangular region having the diagonal connecting a pixel position (0, 0) and a pixel position (130, 1200) is set as the first operation region 1, a rectangular region having the diagonal connecting a pixel position (130, 1050) and a pixel position (1790, 1200) is set as the second operation region 2, and a rectangular region having the diagonal connecting a pixel position (1790, 0) and a pixel position (1920, 1200) is set as the third operation region 3.

Then, a region that does not overlap the first operation region 1, the second operation region 2, and third operation region 3 set in the total image-outputting area is set as the image placement region R. In an example case illustrated in FIG. 10B, a rectangular region having the diagonal connecting a pixel position (130, 1050) and a pixel position (1790, 0) is set as the image placement region R. In this example case, the image placement region R becomes an inscribed rectangle with respect to the first operation region 1, the second operation region 2, and third operation region 3.

Figure 9:
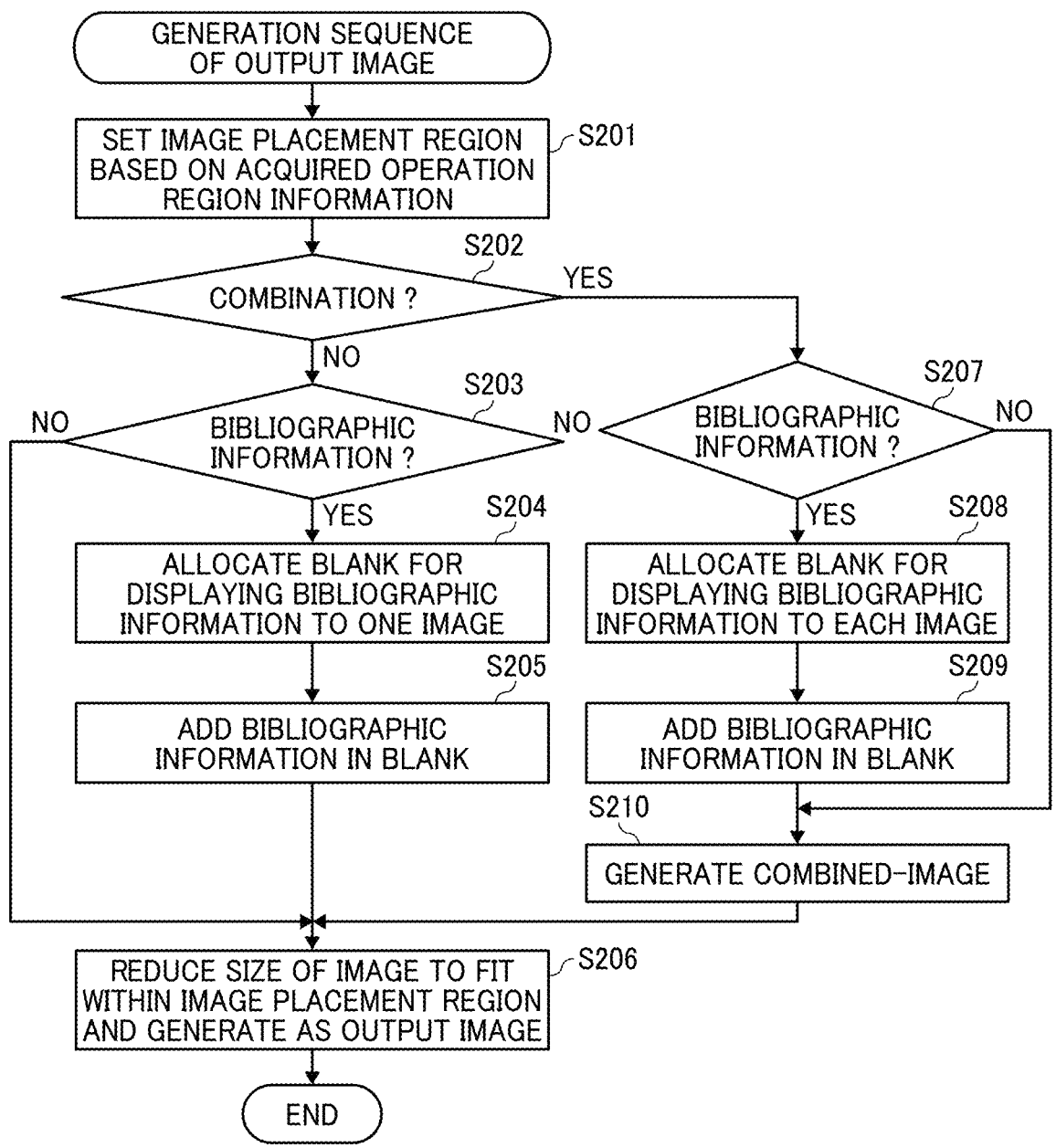
FIG. 9 is an example of a flow chart illustrating steps of a process of generating an output image of the first embodiment.

The description is returned to FIG. 9.

When the image placement region R is set at step S201, it is determined whether the combination is "set" or "none (not set)" at step S202, and then it is determined whether the bibliographic information is "set" or "none (not set)" at step S203. When the combination setting and the bibliographic information setting are both set "none (not set)" (S202: NO, S203: NO), the sequence proceeds to step S206.

At step S206, the output image generation unit 108 reduces a size of image data of one image selected by the user to fit the one image within a size of the image placement region R as illustrated in FIG. 11, and converts an image that places the size-reduced image at the center of the image placement region R to a given format compatible to the image output apparatus selected and used as the connection partner (e.g., electronic information board 30 (IW00A)) to generate an output image. In this configuration, a region not placed with the size-reduced image is set at periphery of the image placement region as illustrated in FIG. 11, and the region not placed with the size-reduced image is referred to as a marginal region "M". The marginal region "M" is preferably set as a monochrome image such as a white image in view of visibility of one or more operation buttons (e.g., icons) to be superimposed and displayed on the marginal region "M."

Figure 13A:
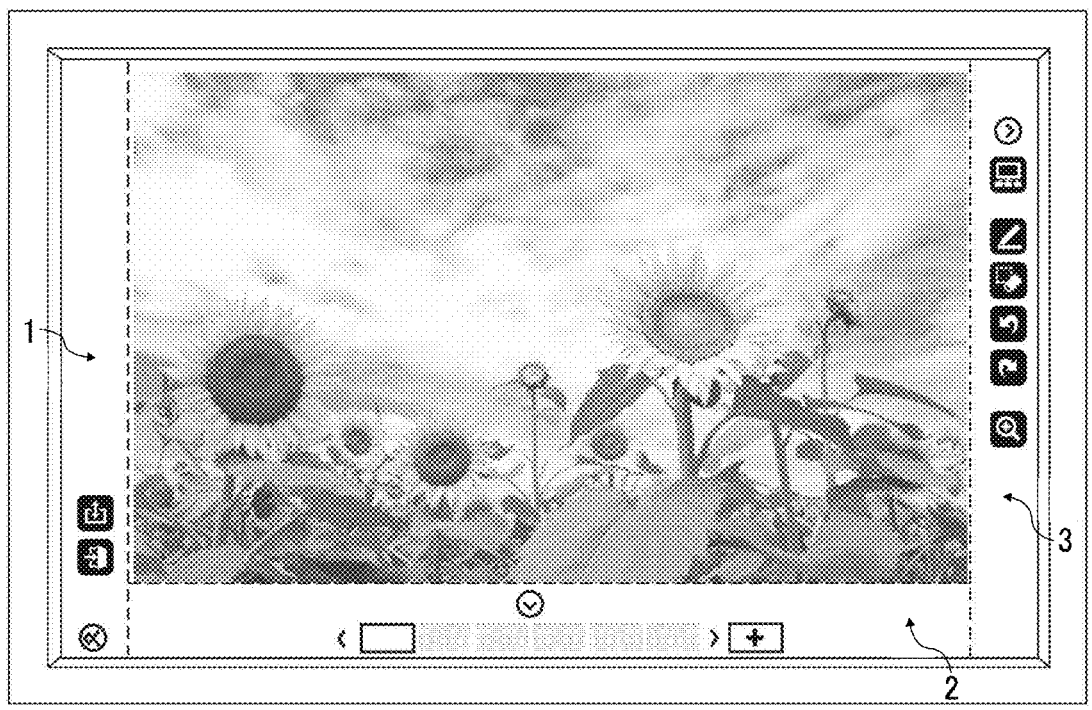
FIGS. 13A and 13B illustrate examples of output images displayed on an image output apparatus.

When the above described "output image generation sequence" is completed, the output image transmission unit 109 transmits the output image illustrated in FIG. 11 to the electronic information board 30 selected and used as the connection partner (step S104 in FIG. 8), and the electronic information board 30 displays the received output image on a display. Therefore, the image data selected by the user is displayed on the display of the electronic information board 30 without overlapping with the first operation region 1, the second operation region 2, and third operation region 3 as illustrated in FIG. 13A.

By contrast, when it is determined that the bibliographic information setting is "set" (S203: YES), the sequence proceeds to step S204. At step S204, the bibliographic information addition unit 106 allocates or sets a blank "m" having a size enough to display the bibliographic information for the image data of one image selected by the user as illustrated in FIG. 12. FIG. 12 illustrates an example case that the blank "m" allocated or set at the lower part of the image is a stripe, but not limited thereto. For example, the blank "m" can be allocated or set at any positions of the image such as upper, lower, left, and right of the image.

Then, at step S205, the bibliographic information addition unit 106 adds the bibliographic information in the blank "m" as illustrated in FIG. 12. In an example case of FIG. 12, a time stamp is added as the bibliographic information, but the bibliographic information added in the blank "m" is not limited to specific information. For example, an image file name, a note of image can be added as the bibliographic information.

Then, at step S206, as illustrated in FIG. 12, the output image generation unit 108 reduces a size of the image added with the bibliographic information to fit within a size of the image placement region R, and converts an image that places the size-reduced image at the center of the image placement region R to a given format compatible to the electronic information board 30 selected and used as the connection partner (IW00A) to generate an output image. In this case too, the marginal region "M" is preferably a monochrome image such as a white image. Hereinafter, it is assumed that the marginal region "M" is set as the monochrome image such as the white image.

Figure 13B:
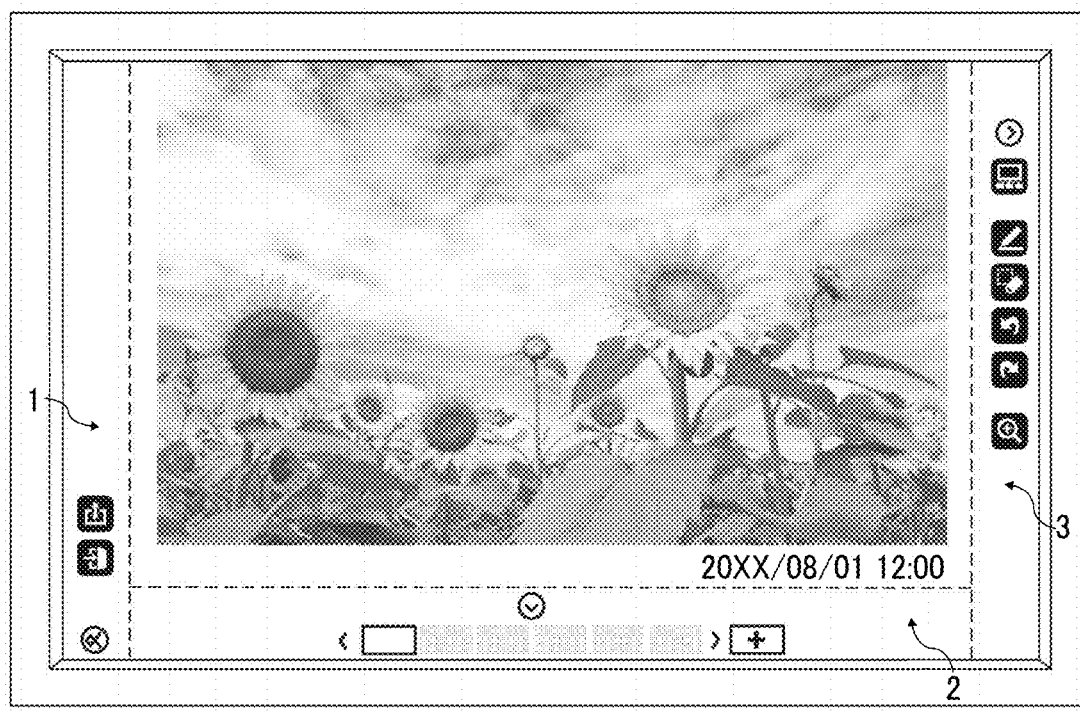

Then, the output image transmission unit 109 transmits the output image illustrated in FIG. 12 to the electronic information board 30 selected and used as the connection partner (step S104 in FIG. 8), and the electronic information board 30 displays the received output image on the display. Therefore, the image data of the one image selected by the user and the bibliographic information (e.g., time stamp) are both displayed on the display of the electronic information board 30 without overlapping with the first operation region 1, the second operation region 2, and third operation region 3 as illustrated in FIG. 13B.

By contrast, when it is determined that the combination setting is "set" (S202: YES), it is determined whether the bibliographic information is "set" or "none (not set)" at step S207. Therefore, when it is determined that the bibliographic information setting is "none (not set)" (S207: NO), the sequence proceeds to step S210. At step S210, the combined-image generation unit 107 generates a combined image that combines two or more image data of two or more images selected by the user as illustrated in FIG. 14.

Then, at step S206, as illustrated in FIG. 14, the output image generation unit 108 reduces a size of the combined image generated at step S210 to fit the combined image within a size of the image placement region R, and converts an image that places the size-reduced combined image at the center of the image placement region R to a given format compatible to the electronic information board 30 (IW00A) selected and used as the connection partner to generate an output image.

Figure 16A:
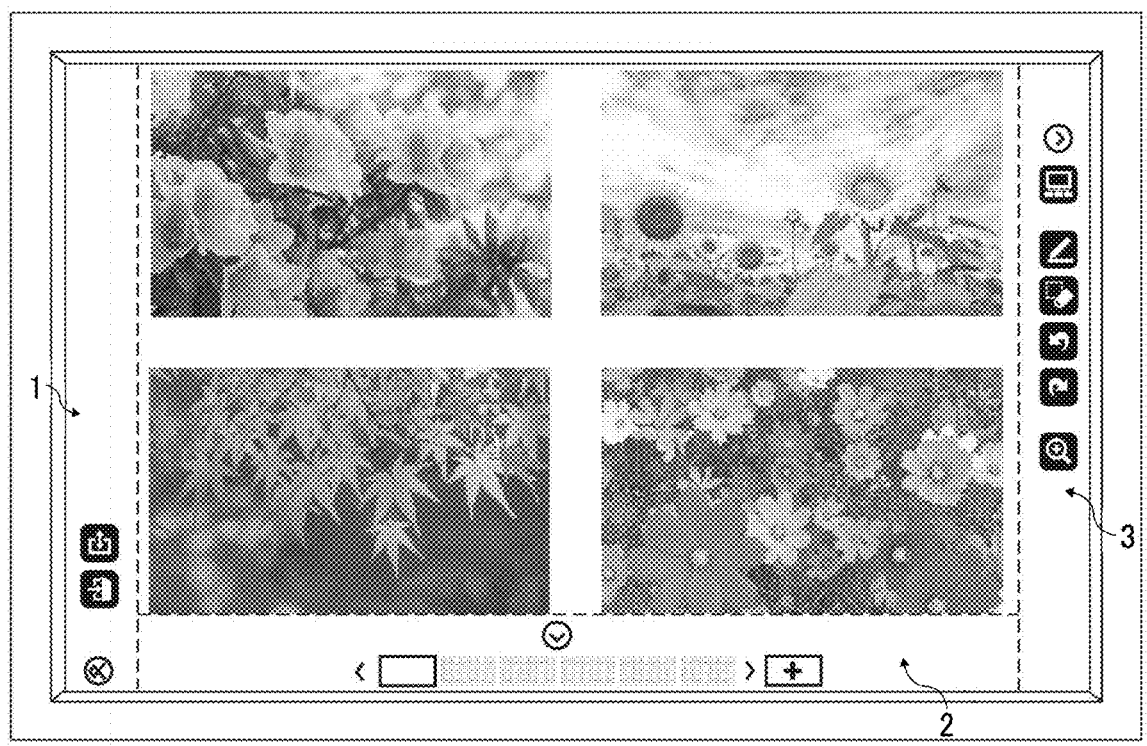
FIGS. 16A and 16B illustrate another examples of output images displayed on an image output apparatus.

Then, the output image transmission unit 109 transmits the output image illustrated in FIG. 14 to the electronic information board 30 selected and used as the connection partner (step S104 in FIG. 8), and the electronic information board 30 displays the received output image on the display. Therefore, as illustrated in FIG. 16A, the combined image that combines the image data of a plurality of images selected by the user is displayed on the display of the electronic information board 30 without overlapping with the first operation region 1, the second operation region 2, and third operation region 3 as illustrated in FIG. 16A.

By contrast, when it is determined that the bibliographic information setting is "set" (S207: YES), the sequence proceeds to step S208. At step S208, the bibliographic information addition unit 106 allocates or sets the blank "m" having a size enough to display the bibliographic information for each of the image data of the plurality of images selected by the user as illustrated in FIG. 15, and then, at step S209, the bibliographic information addition unit 106 adds the bibliographic information in the blank "m" set for each of the image data of the plurality of selected images.

Figure 15:
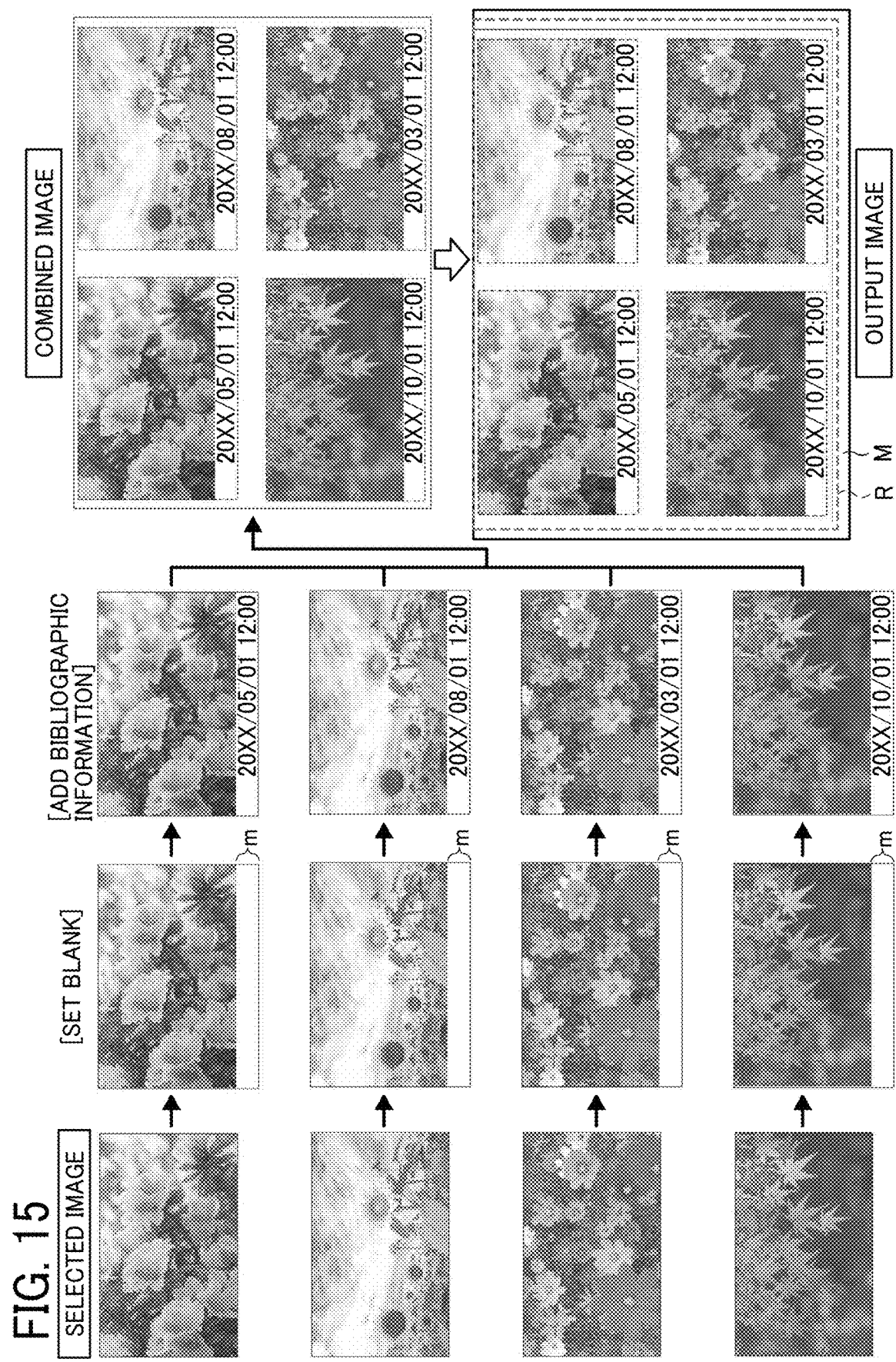
FIG. 15 illustrates another conceptual sequence of generating an output image.

Then, at step S210, the combined-image generation unit 107 generates the combined image that combines two or more images added with the bibliographic information as illustrated in FIG. 15.

Then, at step S206, as illustrated in FIG. 15, the output image generation unit 108 reduces a size of the combined image of two or more images added with the bibliographic information to fit the combined image within a size of the image placement region R, and converts an image that places the size-reduced combined image at the center of the image placement region R to a given format compatible to the electronic information board 30 (IW00A) selected and used as the connection partner to generate an output image.

Figure 16B:
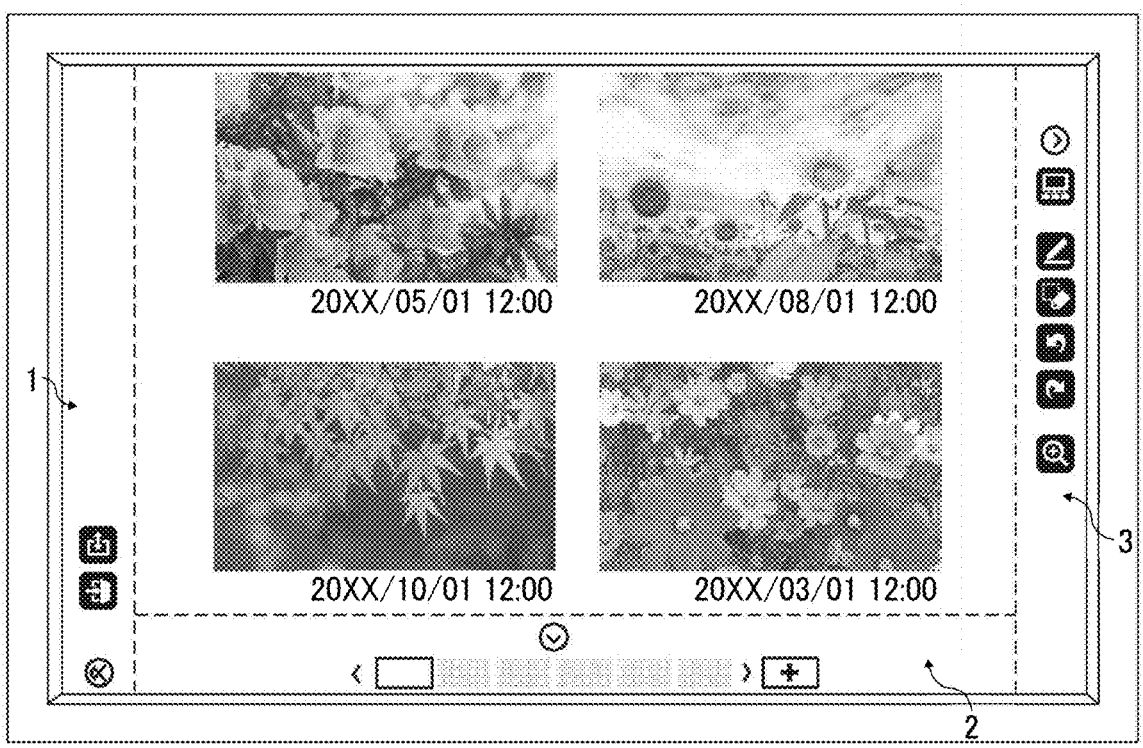

Then, the output image transmission unit 109 transmits the generated output image (FIG. 15) to the electronic information board 30 selected and used as the connection partner (step S104 in FIG. 8), and the electronic information board 30 displays the received output image on the display. Therefore, as illustrated in FIG. 16B, the combined image that combines the image data of the plurality of images selected by the user and the bibliographic information (e.g., time stamp) are both displayed on the display of the electronic information board 30 without overlapping with the first operation region 1, the second operation region 2, and third operation region 3.

In the above described first embodiment, the size of image data is reduced and then displayed without overlapping with the operation region set for the image output apparatus selected and used as the connection partner. Therefore, visibility of both of the image data and the operation region of the image output apparatus can be secured, and actions on the entire area of the image such as writing can be effective, with which operability can be enhanced. Further, in the first embodiment, since the blank "m" used for adding the bibliographic information is set at periphery of the image data depending on the settings, the visibility of the image data of image does not deteriorate by the added bibliographic information.

The image output system 1000 of the first embodiment can be used as above described. Hereinafter a description is given of a second embodiment, in which descriptions of parts common to the parts of the first embodiment may be omitted, and differences of the second embodiment with respect to the first embodiment will be described.

Second Embodiment

Figure 17:
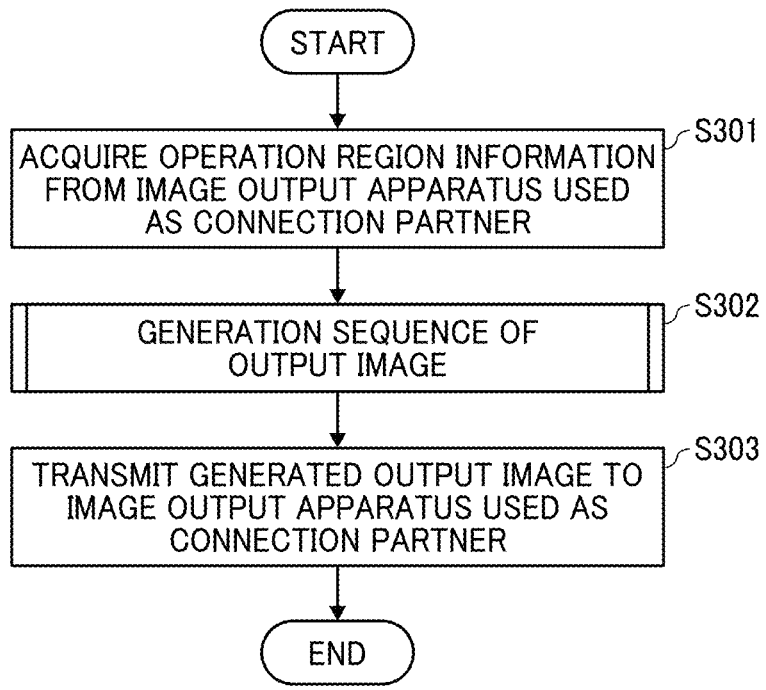
FIG. 17 is an example of a flow chart illustrating steps of a process of performed by an information processing apparatus of a second embodiment.

As to the second embodiment, when a communication between the information processing apparatus 100 and the image output apparatus is established, the information processing apparatus 100 starts a sequence of FIG. 17. FIG. 17 is an example of a flow chart illustrating steps of a process of performed by an information processing apparatus of the second embodiment.

At first, at step S301, the operation region information acquisition unit 104 acquires the operation region information from the image output apparatus selected and used as the connection partner.

Then, at step S302, the sequence of generating an output image is performed based on the acquired operation region information, and then at step S303, the output image transmission unit 109 transmits the generated output image to the image output apparatus selected and used as the connection partner, and then the sequence ends. Since steps S302 and S303 are same as steps S103 and S104 illustrated in FIG. 8, the descriptions of steps S302 and S303 are not described in detail.

Different from the first embodiment, in the second embodiment, the operation region information acquisition unit 104 acquires the operation region information from the image output apparatus used as the connection partner directly, which means the operation region information management table 500 (FIG. 4) is not stored in the storage unit 110 of the information processing apparatus 100 of the second embodiment, but other configuration of the second embodiment is same as the configuration of the first embodiment.

Third Embodiment

Figure 18:
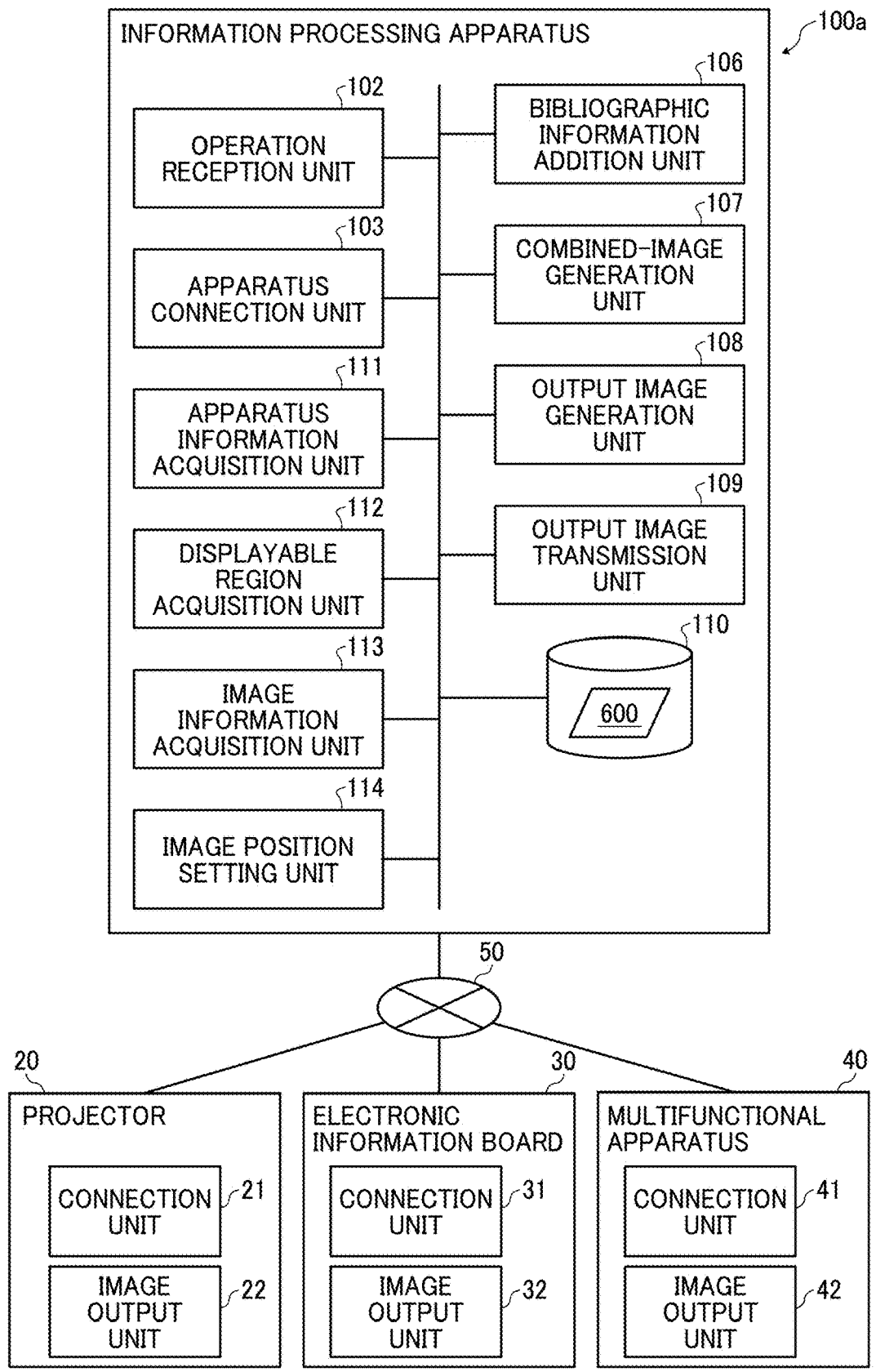
FIG. 18 is an example of a functional block diagram of an information processing apparatus of a third embodiment.

A description is given of a third embodiment. In the third embodiment, an image that is more easily viewable is output based on a displayable region of an output destination apparatus or device. FIG. 18 is an example of a functional block diagram of an information processing apparatus 100a of the third embodiment. Hereinafter, the functional configuration of the information processing apparatus 100a is described with reference to the functional block diagram of in FIG. 18.

As illustrated in FIG. 18, the information processing apparatus 100a of the third embodiment includes, for example, an operation reception unit 102, an apparatus connection unit 103, a bibliographic information addition unit 106, a combined-image generation unit 107, an output image generation unit 108, an output image transmission unit 109, a storage unit 110, an apparatus information acquisition unit 111, a displayable region acquisition unit 112, an image information acquisition unit 113, and an image position setting unit 114. Hereinafter, each of the functional units of the information processing apparatus 100a is described. Since the operation reception unit 102, the apparatus connection unit 103, the bibliographic information addition unit 106, the combined-image generation unit 107, the output image generation unit 108, the output image transmission unit 109, and the storage unit 110 are same for the first embodiment (FIG. 3) and the third embodiment, the description of the same units may be omitted.

The apparatus information acquisition unit 111 acquires apparatus information of the image output apparatus such as type and apparatus name of the image output apparatus connected to the information processing apparatus 100a via the apparatus connection unit 103.

The displayable region acquisition unit 112 acquires data of a region where an image can be displayed (hereinafter, image displayable region data) of each of the apparatuses stored in the storage unit 110 based on the apparatus information acquired by the apparatus information acquisition unit 111. Further, the displayable region acquisition unit 112 can acquire the image displayable region data of each of the apparatuses based on management information base (MIB) of each of the apparatuses connected to the information processing apparatus 100a via the apparatus connection unit 103.

The image information acquisition unit 113 acquires information selected by a user such as image size and display orientation (hereinafter, "display-related information").

The image position setting unit 114 allocates or places one or more images with a layout suitable for each of the apparatuses based on the image displayable region data of each of the apparatuses acquired by the displayable region acquisition unit 112 and the display-related information of each of the images acquired by the image information acquisition unit 113.

The storage unit 110 stores a displayable region information management table 600 (FIG. 19) that correlates apparatus type information and displayable region information of the image output apparatus, and manages the apparatus type information and the displayable region information of the image output apparatus.

Further, as illustrated in FIG. 18, the image output apparatuses such as the projector 20, the electronic information board 30, and the multifunctional apparatus 40 can be connected to the information processing apparatus 100a wirelessly and/or by wire. Each of the projector 20, the electronic information board 30, and the multifunctional apparatus 40 respectively includes connection units 21, 31, and 41 for connecting and communicating with the information processing apparatus 100a, and image output units 22, 32, and 42 for outputting image data received from the information processing apparatus 100a.

FIG. 19 is an example of the displayable region information management table 600 stored in the storage unit 110. As illustrated in FIG. 19, the displayable region information management table 600 includes, for example, fields 601, 602, 603, and 604. Specifically, the field 601 is used to store information of type of the image output apparatus, the field 602 is used to store identification information (e.g., apparatus name) for identifying each of the image output apparatus, the field 603 is used to store information of a display region size of each of the image output apparatuses, and the field 604 is used to store information of display orientation of each of the image output apparatuses.

The display region size indicates a region where each of the image output apparatuses can output an image, and has a size specifically set for each of the image output apparatuses. For example, when the image output apparatus is a projector, the display region size is a projection region where the projector can project an image, when the image output apparatus is an electronic information board, the display region size is a size of a screen of the electronic information board, and when the image output apparatus is a printer, the display region size is a printable region of the printer.

The display orientation indicates an orientation of displaying an image outputted by each of the image output apparatuses. For example, the display orientation indicates an orientation of a screen and a display, and an orientation of sheet to be printed with an image.

Figure 20A:
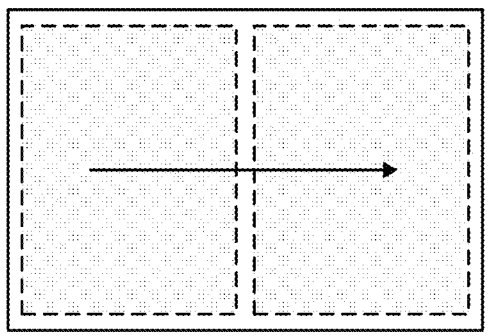
FIGS. 20A, 20B, 20C, 20D, 20E and 20F illustrates examples of layout patterns for allocating a plurality of images.
Figure 20B:
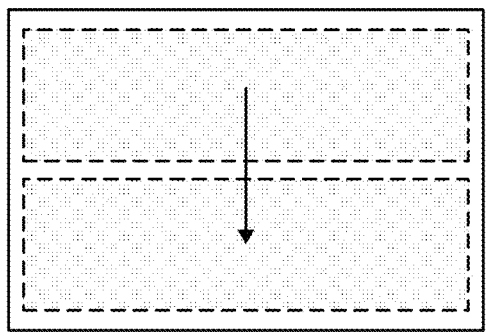
Figure 20C:
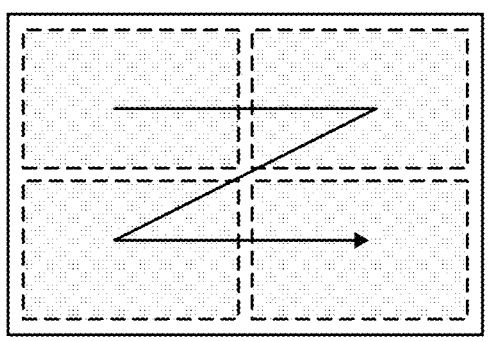
Figure 20D:
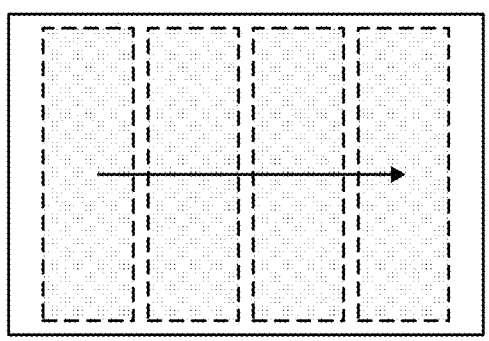
Figure 20E:
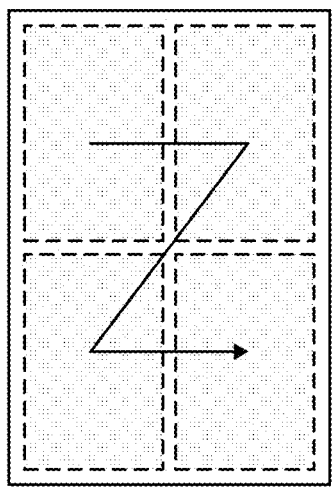
Figure 20F:
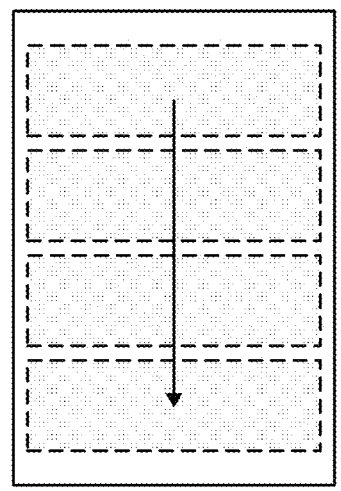

A description is given of combination patterns and layout patterns of selected images. FIG. 20 illustrates examples of layout patterns for allocating or placing a plurality of images. FIGS. 20A and 20B illustrate examples of layout patterns of selected two images, in which the display region is along the horizontal direction. FIGS. 20C and 20D illustrate examples of layout patterns of selected four images, in which the display region is along the horizontal direction. FIGS. 20E and 20F illustrate examples of layout patterns of selected four images, in which the display region is along the vertical direction. The region indicated by a broken line in FIG. 20 indicates a region where an image can be arranged or allocated, and the arrow line in FIG. 20 indicates an arrangement order of the plurality of images.

When two or more images are selected, as illustrated in FIG. 20, various allocation methods can be applied, in which visibility of image may be impaired depending on the image size and the display orientation of the selected images. For example, when two landscape-type images are selected, and the two landscape-type images are to be displayed with the layout pattern of FIG. 20A, the size of each of the images is reduced to fit each of the images in the width direction, with which the size of the two landscape-type images become smaller, and thereby visibility of the images is impaired. Therefore, when the two landscape-type images are selected, the two landscape-type images are preferably displayed by using the layout pattern of FIG. 20B.

As described above, in the third embodiment, the information processing apparatus 100a applies an appropriate layout pattern based on the image size and the display orientation of the selected images. Further, the layout patterns illustrated in FIG. 20 are just examples, which means the number of selected images is not limited to two or four images, and the layout patterns of the selected images are not limited to the layout patterns illustrated FIG. 20.

Figure 21:
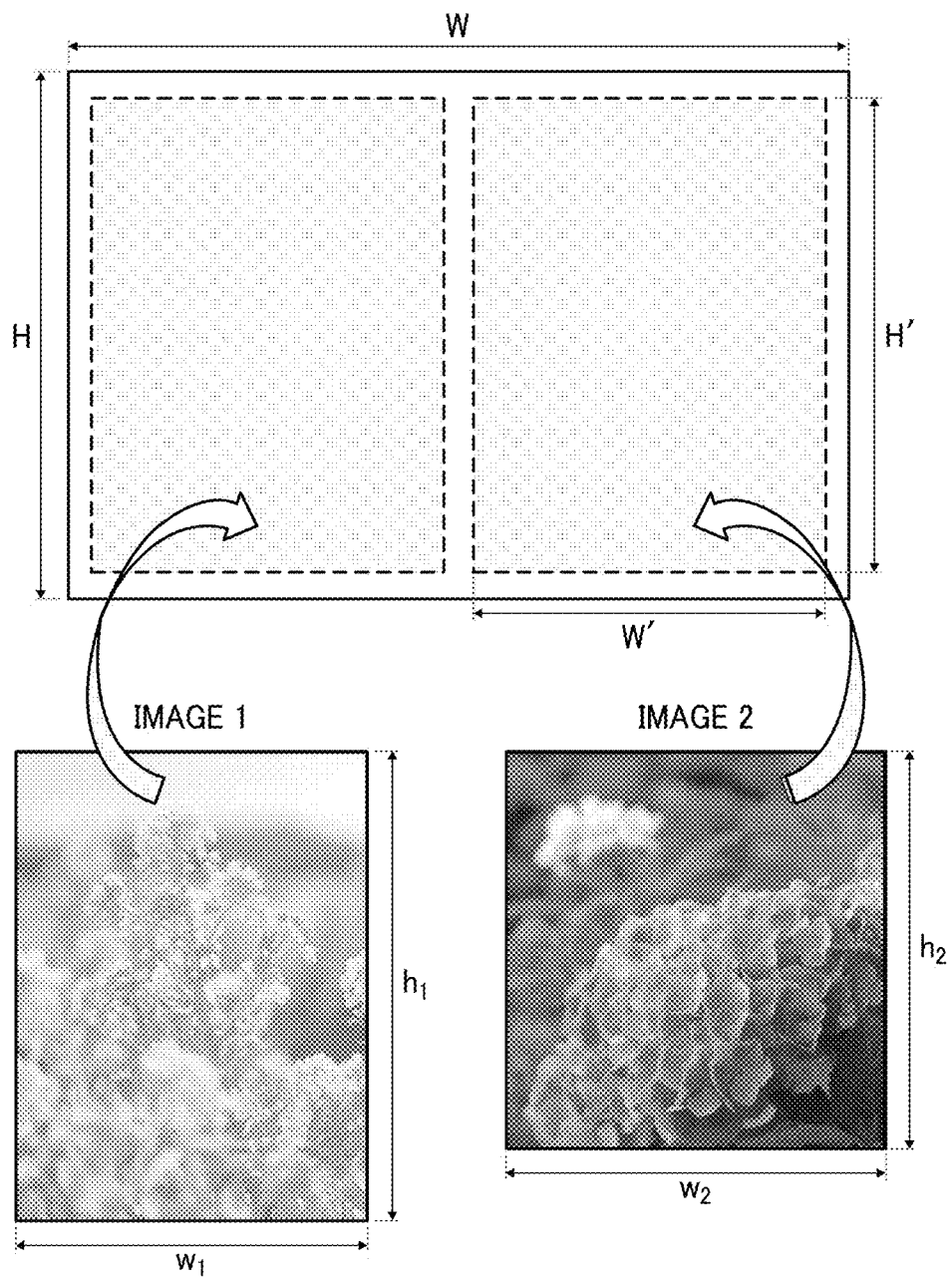
FIG. 21 illustrates a relationship of a displayable region and an image size.

As above described, the layout patterns of the output image can be set with various patterns as illustrated in FIG. 20. Hereinafter, a description is given of a method of setting a suitable layout pattern for the output image based on the image output apparatus and images. FIG. 21 illustrates a relationship of a displayable region and an image size.

FIG. 21 illustrates an example case that two images 1 and 2 are selected, and the images 1 and 2 are arranged or allocated in a displayable region of the landscape type or horizontal type. Hereinafter, FIG. 21 is referred when required. As illustrated in FIG. 21, the width of the displayable region is set with W, the height of the displayable region is set with H, the width of the region where the image can be arranged or allocated within the displayable region is referred to as W', the height of the region where the image can be arranged or allocated within the displayable region is referred to as H'. Further, the width of each of the images 1 and 2 is referred to as w1 and w2, and the height of each of the images 1 and 2 is referred to as h1, and h2.

Figure 22:
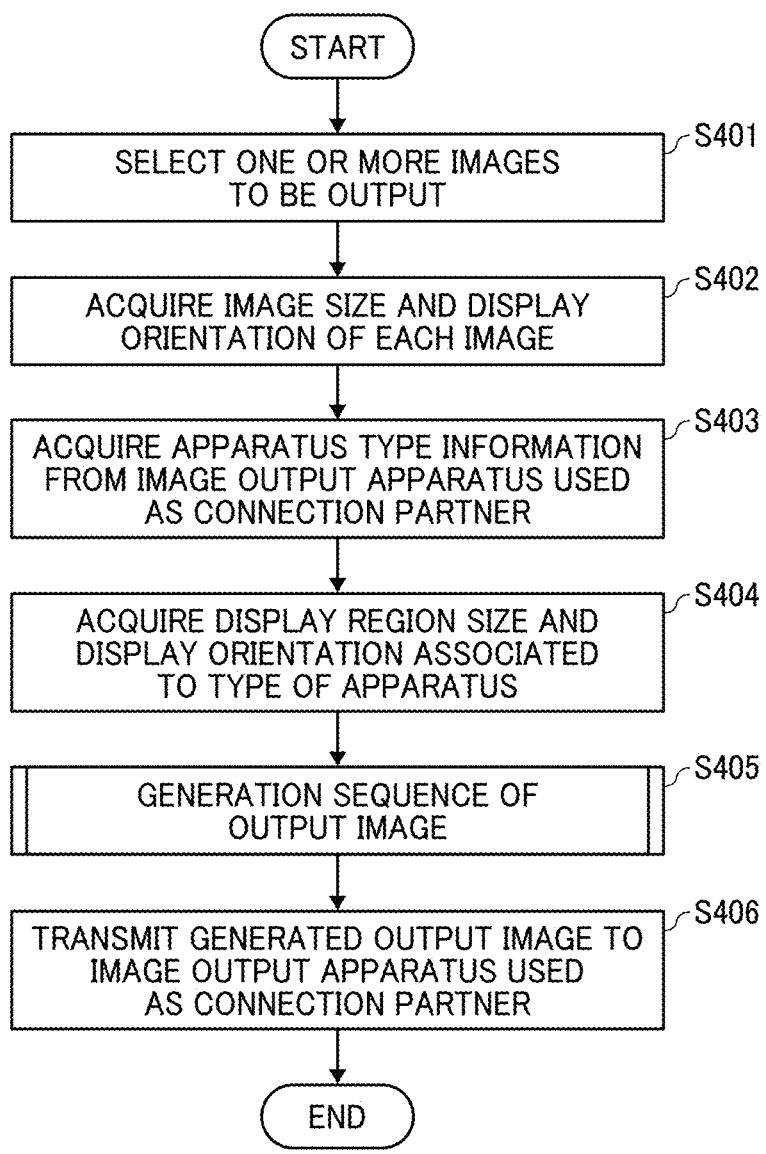
FIG. 22 is an example of a flow chart illustrating steps of a process performed by the information processing apparatus of the third embodiment.

FIG. 22 is an example of a flow chart illustrating steps of a process performed by the information processing apparatus 100a of the third embodiment. At step S401, a user selects an image to be output. The selection of image at step S401 can be performed via the operation reception unit 102, or can be performed on the screens illustrated in FIGS. 4 to 6. The image selected at step S401 can be a single image or a plurality of images.

At step S402, the image information acquisition unit 113 acquires the display-related information (e.g., image size and display orientation) of each of the images selected at step S401. At step S403, the apparatus information acquisition unit 111 transmits an acquisition request of apparatus type information to an image output apparatus connected via the apparatus connection unit 103 to acquire the apparatus information of the image output apparatus (e.g., type of apparatus). Further, the sequence order of steps S402 and S403 can be switched. Further, the process of step S403 is equivalent to the process of step S101 in FIG. 8.

Then, at step S404, the displayable region acquisition unit 112 searches the displayable region information management table 600 (FIG. 19) stored in the storage unit 110 by using the type of apparatus acquired at step S403 as a search key to acquire the display region size and the display orientation associated to the type of apparatus. Further, the process of step S404 is equivalent to the process of step S102 in FIG. 8. Further, instead of acquiring the display region size at step S404, the display region size can be acquired with the type of apparatus and the apparatus name when acquiring the apparatus information at step S403, or the display region size alone can be acquired at step S404.

At step S405, the sequence for generating an output image is performed based on the acquired display region size and display orientation. The detail of step S405 will be described later.

At step S406, the output image transmission unit 109 transmits the generated output image to the image output apparatus selected and used as the connection partner to end the sequence. Further, the process of step S406 is equivalent to the process of step S104 in FIG. 8.

Figure 23:
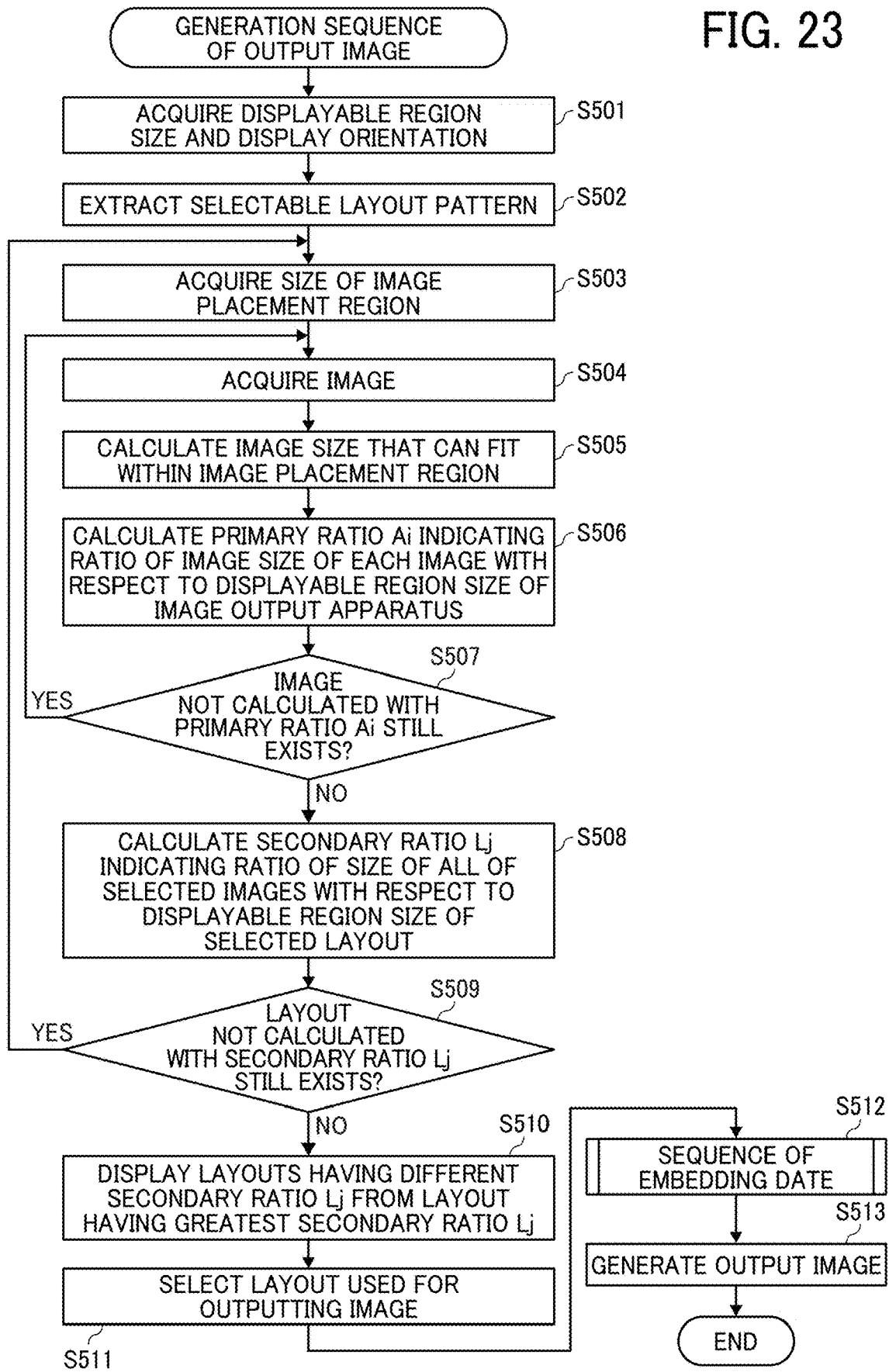
FIG. 23 is an example of a flow chart illustrating the steps of a process of generating an output image of the third embodiment.

Hereinafter, a description is given of the detail of the output image generation sequence performed at step S405 with reference to FIG. 23. FIG. 23 is an example of a flow chart illustrating steps of a process of generating an output image.

When the output image generation sequence is started, at step S501, the image position setting unit 114 acquires the displayable region size defined by the width W and height H (FIG. 21), and the display orientation acquired at step S404. Further, the image position setting unit 114 can determine whether the display orientation is the portrait (vertical) or landscape (horizontal) based on values of the width W and the height H of the displayable region.

At step S502, the image position setting unit 114 extracts selectable one or more layout patterns based on the displayable region size and the display orientation acquired at step S501, and the number of images selected at step S401. At step S502, the image position setting unit 114 can extract a plurality of layout patterns because the selectable layout patterns vary depending on the displayable region size of the output destination apparatus (e.g., image output apparatus) and the number of selected images. For example, when the displayable region is the landscape or horizontal type, and two images are selected, the image position setting unit 114 extracts the layout patterns of FIGS. 20A and 20B, and when displayable region is the portrait or vertical type, and four images are selected, the image position setting unit 114 extracts the layout patterns of FIGS. 20E and 20F.

At step S503, the image position setting unit 114 selects one layout pattern from the extracted layout patterns, and acquires a size of an image placement region defined by the width W' and height H' (FIG. 21) of the selected layout. For example, in an example case of FIG. 21, the image placement region is set for two in the displayable region size. Hereinafter, for the simplicity of description, one layout selected from the extracted plurality of layout patterns is referred to a "j"-th layout," wherein "j" is an integer.

At step S504, the image selected at step S401 is acquired. Further, when a plurality of images is selected at step S401, one of the images is selected and acquired at step S504, and the processing of steps S504 to S506 are performed for each one of the images. Hereinafter, for the simplicity of description, one of the selected plurality of images used as a process target image is referred to "i"-th image, wherein "i" is an integer.

At step S505, the image position setting unit 114 sets the layout, compares the size of the image placement region (W', H') and "i"-th image size (wi, hi), and calculates an image size of the "i"-th image that can fit within the size of the image placement region, in which the image size of the "i"-th image is changed so that the image size of the "i"-th image can fit within the size of the image placement region. Further, the image size of the "i"-th image before changing the image size is referred to "width wi and height hi," and the image size of the "i"-th image after changing the image size is referred to "width wi' and height hi'."

After changing the image size at step S505, at step S506, the image position setting unit 114 calculates a primary ratio Ai indicating a ratio of the image size of the "i"-th image with respect to the displayable region size of the output destination apparatus (e.g., image output apparatus). The primary ratio Ai can be calculated by using the following formula (1).

$$Ai=(wi'\times hi')/(W\times H) \quad (1)$$

After calculating the primary ratio Ai at step S506, at step S507, it is determined whether an image not calculated with the primary ratio Ai still exists. Specifically, when an image not calculated with the primary ratio Ai still exists (S507: YES), the sequence returns to step S504, and an "i+1"-th image is acquired, and then the processing of steps S504 to S506 are performed for the "i+1"-th image. The processing of steps S504 to S506 are performed repeatedly until the primary ratio Ai is calculated for all of the selected images. When the primary ratio Ai is calculated for all of the selected images (S507: NO), the sequence proceeds to step S508.

At step S508, a secondary ratio Lj indicating a ratio of the size of all of the selected images with respect to the displayable region size of the selected "j"-th layout is calculated based on values of the primary ratio Ai calculated for each of the selected images. The secondary ratio Lj can be calculated by using the following formula (2).

$$Lj=\Sigma Ai=(wi'\times hi'+\ldots+wi'\times hi')/(W\times H) \quad (2)$$

At step S509, it is determined whether a layout not calculated with the secondary ratio Lj still exists. Specifically, when a layout not calculated with the secondary ratio Lj still exists (S509: YES), the sequence returns to step S503, and a "j+1"-th layout is selected, and the processing of step S503 and subsequent steps are performed repeatedly until the secondary ratio Lj is calculated for all of the layouts. When the secondary ratio Lj is calculated for all of the layouts (S509: NO), the sequence proceeds to step S510.

At step S510, the plurality of layouts, which may have different secondary ratio Lj, are presented to a user as display candidates, in which the plurality of layouts having the different secondary ratio Lj are displayed from the layout having the greatest secondary ratio Lj (i.e., descending order of the value of Lj). At step S510, an image generated by the combined-image generation unit 107 is displayed by using the layout set by the image position setting unit 114.

As indicated in the formula (2), the secondary ratio Lj is the total sum of the primary ratio Ai of each of the selected images, and indicates a ratio of the size of all of the selected images with respect to the displayable region size of the selected "j"-th layout. Therefore, the greater the secondary ratio Lj of the layout, the images can be displayed with a greater size, which means the greater the secondary ratio Lj of the layout, it can be determined that the layout is easy to see the images when the images is displayed.

Figure 24:
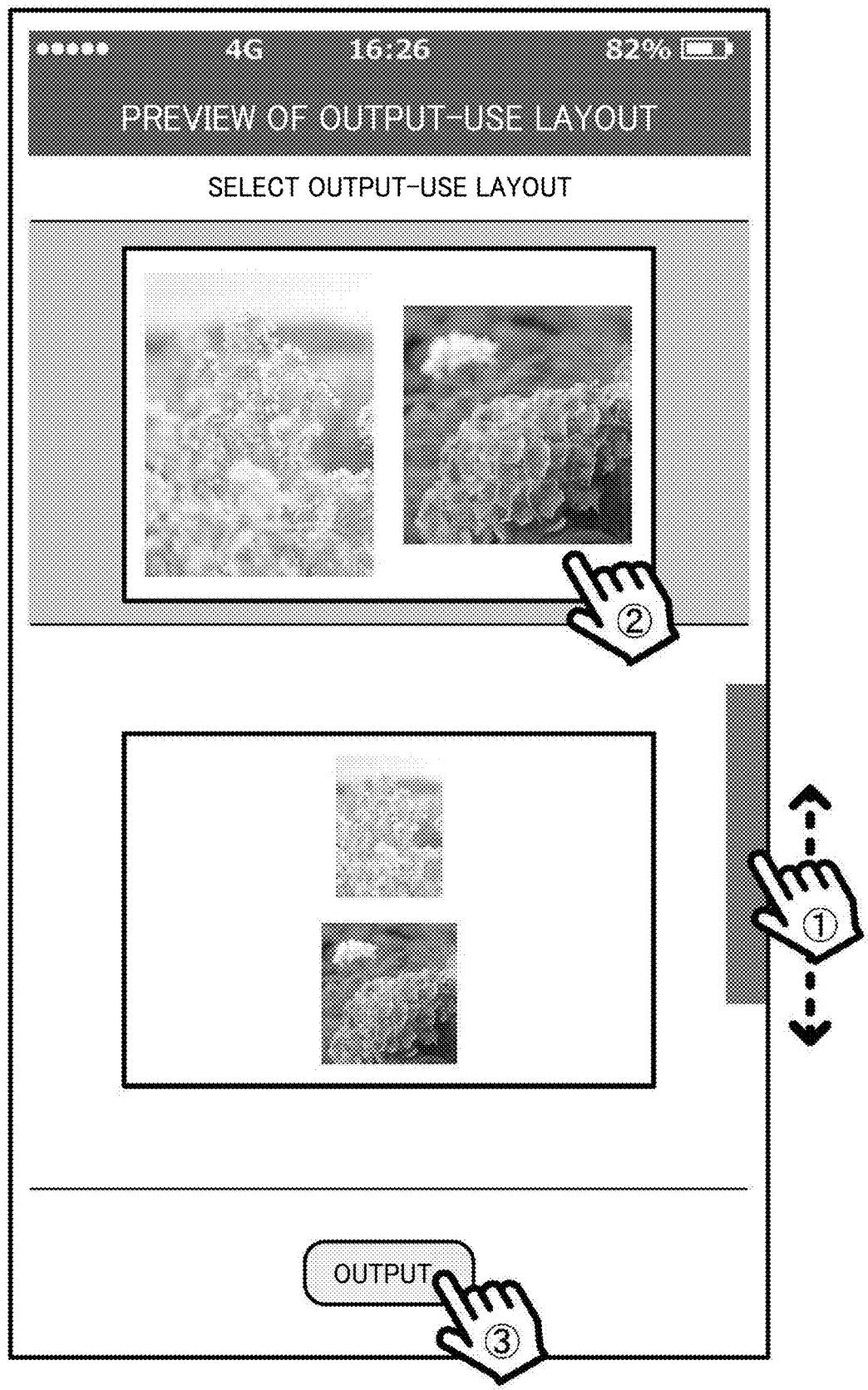
FIG. 24 is an example of an output-use layout selection screen.

At step S511, the user selects a layout used for outputting the image from the layouts displayed at step S510. FIG. 24 is an example of an output-use layout selection screen. The user can select the layout from the output-use layout selection screen of FIG. 24.

As illustrated in FIG. 24, the output-use layout selection screen displays preview images from the layout having the greatest secondary ratio Lj (i.e., descending order of the value of Lj). In an example case of FIG. 24, the user slides a scroll bar, or taps the layout to select the layout used for outputting the image. When the layout is selected, and then an output button is tapped, the output-use image can be determined.

In an example case of FIG. 24, the output-use layout selection screen displays one layout arranging two images along the left and the right of the displayable region of the landscape type, and another layout arranging two images along the top and the bottom of the displayable region of the landscape type. As above described, the preview image is displayed from the layout having the greatest secondary ratio Lj (i.e., descending order of the value of Lj), and the preview image having the greater secondary ratio Lj displays the images with a greater size. Therefore, the layout that is easy to see the images is displayed with a higher priority, with which a user can easily determine and select which layout is easy to see the images. In an example case of FIG. 24, since each of the two images is a portrait image, the layout arranging the two images along the left and the right of the displayable region has a greater secondary ratio Lj, in which each of the two images are displayed with a greater size, and thereby the user can determine the layout that is easy to see the two images.

Further, the layout selection can be performed without the user operation. Specifically, when the layout having the greatest secondary ratio Lj is determined by circuitry or a processor of the information processing apparatus 100a, the information processing apparatus 100a can be configured to select the layout automatically, in which steps S510 and S511 can be omitted.

The description is returned to the sequence of FIG. 23. After selecting the layout used for outputting the image at step S510, at step S512, the bibliographic information addition unit 106 performs a sequence embedding of date. The detail of the date embedding sequence will be described later. Further, when a time stamp is not to be embedded in the image based on user settings, step S512 can be omitted.

At step S513, the output image generation unit 108 generates an output image based on the combined image generated by the combined-image generation unit 107 and the layout selected by the user at step S511. Further, when the date embedding sequence is performed at step S512, the output image generation unit 108 generates the images embedded with the time stamp as the output image.

When the output image is generated, the output image generation sequence is ended, and the sequence proceeds to step S406 in FIG. 22.

Figure 25:
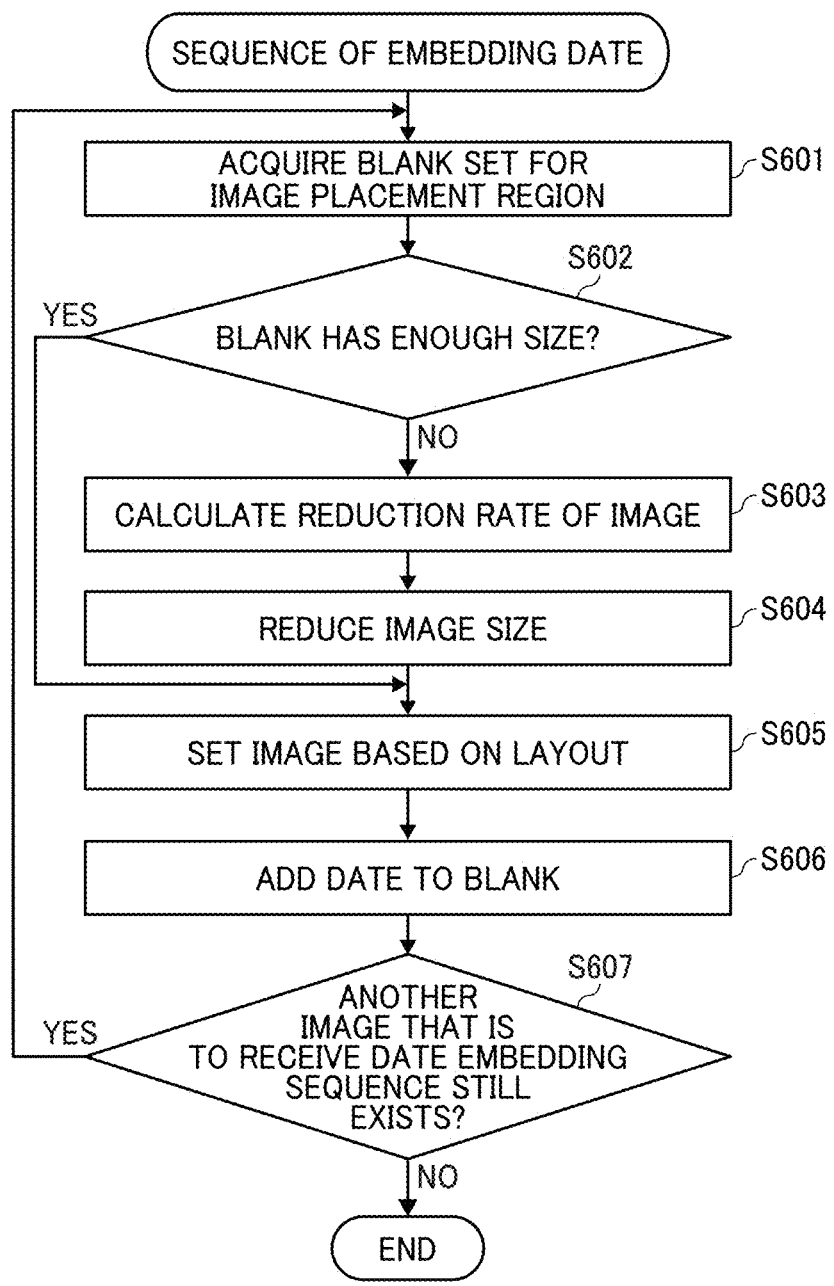
FIG. 25 is an example of a flow chart illustrating steps of a process of embedding a date.

Hereinafter, a description is given of the date embedding sequence performed at step S512 with reference to FIGS. 25 and 26. FIG. 25 is an example of a flow chart illustrating steps of a process of embedding the date. Further, FIG. 26 illustrates examples of images embedded with a time stamp. Hereinafter, a description is given with reference to FIGS. 25 and 26. Further, the bibliographic information embedded in the image is not limited to the time stamp, but can be, for example, a file name of image, and a note of image.

Figure 26A:
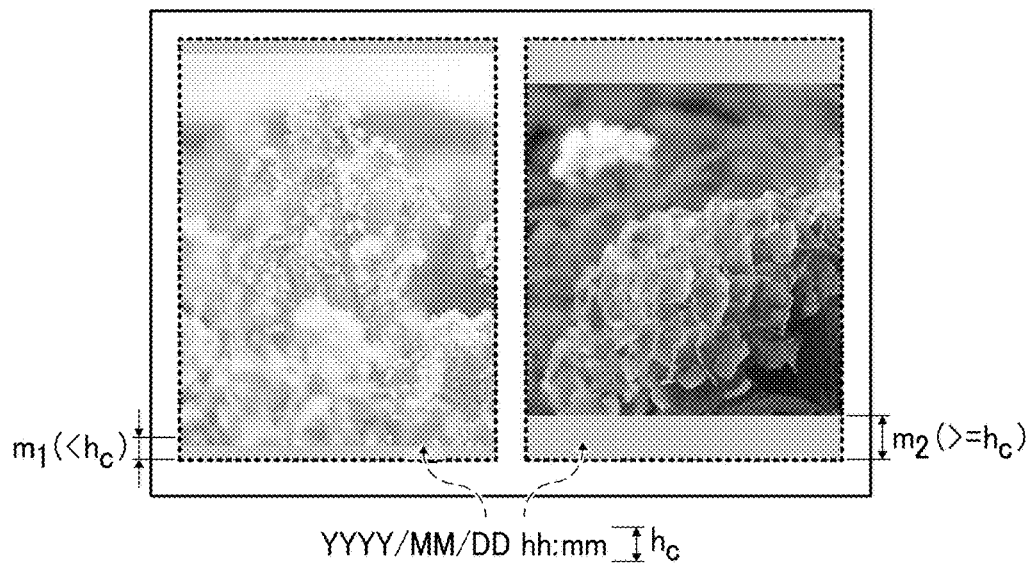
FIGS. 26A, 26B and 26C illustrate examples of images embedded with a time stamp.

When the date embedding sequence is started, at step S601, the bibliographic information addition unit 106 acquires a value of the blank "m" set for the image placement region for one image that is to receive the date embedding sequence. As illustrated in FIG. 26A, the blank "m" is set as a blank space or section when an image is placed in the image placement region.

At step S602, the bibliographic information addition unit 106 determines whether the blank "m" has a size enough for embedding the bibliographic information such as date. The processing of step S602 can be determined by using the following formula (3). In the formula (3), "hc" indicates a height of the to-be-embedded bibliographic information (see FIG. 26A).

$$(H'-hi')/2 > hc \quad (3)$$

At step S602, as indicated in the formula (3), a difference of the height H' of the image placement region (FIG. 21) and the height hi' of the size-changed image is divided by two to obtain a value, and then the value is compared with the "hc" to determine whether the blank "m" has the size enough for embedding the bibliographic information. Further, the formula (3) is used when an image is set at the center of the image placement region. Therefore, for example, when the image is not set at the center of the image placement region, the left side term of the formula (3) is not required to be divided by two.

When the bibliographic information addition unit 106 determines that the blank "m" has the size enough for embedding the time stamp (S602: YES) the sequence proceeds to step S605. In an example case of FIG. 26A, since the blank "m2" set for the image placement region at the right side of FIG. 26A is equal to or greater than "hc" (m2>hc), the reduction of image size is not required, and the sequence proceeds to step S605. By contrast, when the bibliographic information addition unit 106 determines that the blank "m" does not has the size enough for embedding the time stamp (S602: NO), the sequence proceeds to step S603. In an example case of FIG. 26A, since the blank "m1" set for the image placement region at the left side of FIG. 26A is smaller than "hc" (m1<hc), the sequence proceeds to step S603.

At steps S603 and S604, the size of the image is reduced to set the blank "m" having the size enough for embedding the bibliographic information such as the time stamp. At step S603, the reduction rate of image is calculated. The reduction rate of image can be calculated by using the following formula (4).

$$\text{Reduction rate} = [hi' - (hc-m)]/hi' \quad (4)$$

The reduction rate of image is a rate to reduce the height of a current image before performing a reduction of the image height to another height to set the blank "m" having a size enough for embedding the bibliographic information. In the formula (4), the term of "(hc−m)" indicates a difference of the height of bibliographic information "hc" and the height of the blank "m" of the current image before performing the reduction of the image height, and the height of the current image is required to be reduced for a value corresponding to the difference. When the value corresponding to the difference indicated by "(hc−m)" is subtracted from the height hi' of the current image before performing the reduction of the image height, a value of another height of the current image that can be set with the blank "m" having the size enough for embedding the bibliographic information can be calculated. Therefore, as indicated in the formula (4), the reduction rate of the current image can be defined by dividing another height of the current image set with the blank "m" having the size enough for embedding the bibliographic information by the height of the current image before performing the reduction of the image height. The current image is a process target image.

Figure 26B:
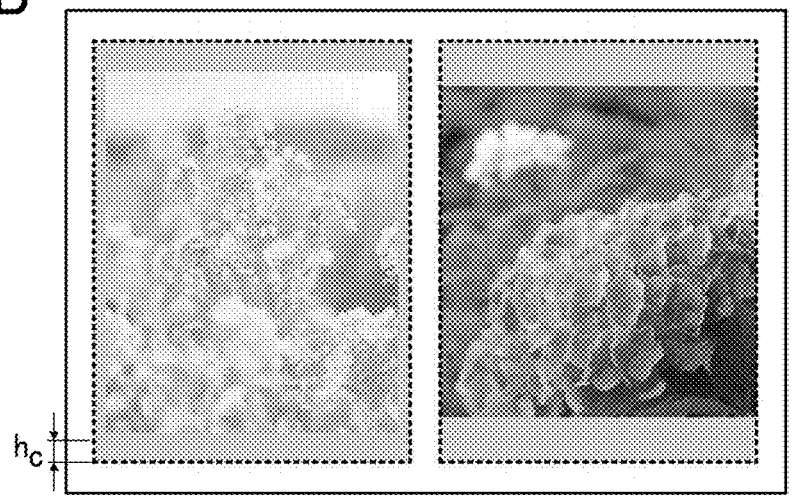

After calculating the reduction rate of image at step S603 by using the formula (4), at step S604, the image height is reduced by applying the reduction rate of image calculated by using the formula (4). Therefore, even if it is determined that the process target image does not have a blank having the size enough for embedding the bibliographic information (e.g., time stamp) at step S602, the blank used for embedding the bibliographic information can be set as illustrated in FIG. 26B.

At step S605, the image that is determined that can be embedded with the time stamp at step S602, and the image reduced at step S604 are set in the image placement region by using the selected layout. FIG. 26B is an example of a layout of the images set in the image placement region at step S605.

Figure 26C:
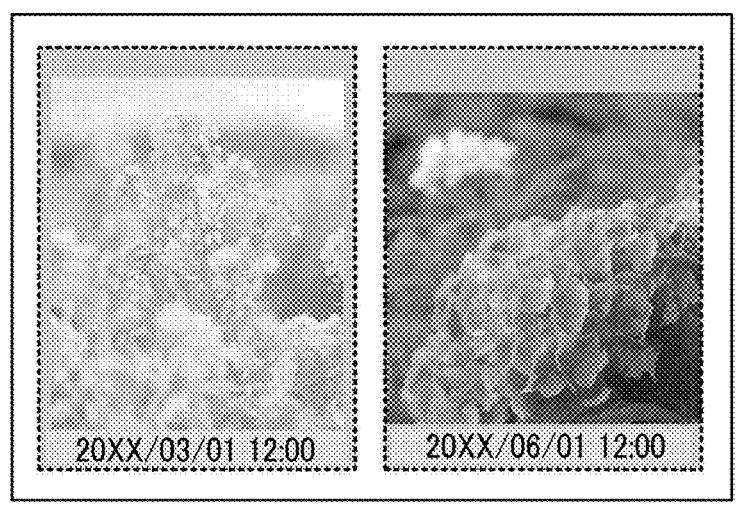

At step S606, the bibliographic information (e.g., date) is added to the blank set for each of the images set in each of the image placement regions at step S605. FIG. 26C is an example of images embedded with the time stamp.

Then, at step S607, the bibliographic information addition unit 106 determines whether another image that is to receive the date embedding sequence still exists. When another image still exists (S607: YES), the sequence returns to step S601, and the processing from steps S601 to S606 are performed repeatedly for all of the images. By contrast, when another image does not exist (S607: NO), the date embedding sequence is ended.

In the above described third embodiment, an output image that sets a plurality of images with a greater size and easy-to-see layout can be obtained.

Further, similar to the second embodiment, the displayable region information management table 600 can be omitted from the storage unit 110 of the information processing apparatus 100a of the third embodiment. In this case, each of the image output apparatuses stores the displayable region information, and the apparatus information acquisition unit 111 is configured to acquire the apparatus information of the image output apparatus such as type and apparatus name, and also the displayable region information from each of the image output apparatuses.

Figure 27:
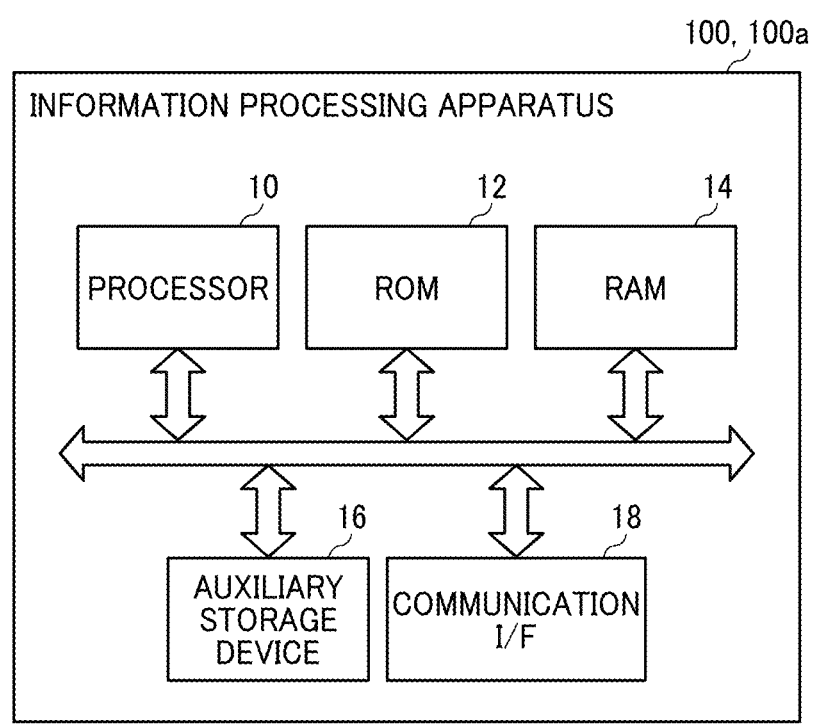
FIG. 27 is an example of a hardware configuration of the information processing apparatus of the embodiments.

A description is given of a hardware configuration of a computer employed for the information processing apparatuses 100 and 100a of the above described embodiments with reference to FIG. 27.

As illustrated in FIG. 27, the computer employed for the information processing apparatuses 100 and 100a includes, for example, a processor 10, a read only memory (ROM) 12, a random access memory (RAM) 14, an auxiliary storage device 16, and a communication interface (I/F) 18. The processor 10 controls the entire operations of the information processing apparatuses 100 and 100a. The ROM 12 stores programs such as a boot program and a firmware program. The RAM 14 provides an execution space of program. The auxiliary storage device 16 stores programs and an operating system (OS) to implement the above described functional units in the information processing apparatuses 100 and 100a. The communication I/F 18 is used to establish a communication connection between the information processing apparatuses 100, 100a, and the image output apparatus.

As to the above described information processing apparatus of the embodiments, the size of images and the layout of images can be adjusted in line with various types of image output apparatuses.

Each of the functions in the above-described embodiments can be implemented by one or more programs described by using, for example, C, C++, C#, Java (registered trademark) and the like. The program of the embodiments can be stored in a recording medium or a storage medium such as hard disk device, compact disc-read only memory (CD-ROM), magnetic optical disc (MO), DVD, flexible disk, electrically erasable programmable read-only memory (EEPROM), erasable programmable read-only memory (EPROM), and the like, and can be distributed as the recording medium or a storage medium, or can be transmitted via a network in a form that other devices can use.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. For example, the CPU can be implemented by one or more processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Numerous additional modifications and variations for the modules, the units, and the apparatuses, and the systems are possible in light of the above teachings. It is therefore to be understood that within the scope of the appended claims, the description of present disclosure may be practiced otherwise than as specifically described herein. For example, elements and/or features of different examples and illustrative embodiments may be combined each other and/or substituted for each other within the scope of present disclosure and appended claims.

What is claimed is:

1. An information processing apparatus, connectable with a plurality of types of image output apparatuses via a network, the information processing apparatus comprising: circuitry configured to,
    receive a selection of image data to output,
    transmit, over the network, an acquisition request of apparatus type information from one of the plurality of types of the image output apparatuses,
    acquire, from the one of the plurality of types of the image output apparatuses, information of an image placement region of the one of the plurality of types of the image output apparatuses in response to the acquisition request, the image placement region being variable depending on a type of the image output apparatuses,
    generate an output image by adjusting a size of the image data within the image placement region based on the image data and the information of the image placement region acquired from the one of the plurality of types of the image output apparatuses such that the information processing apparatus generates the output image after the selection of the image data to output, and
    transmit, over the network, the output image to the one of the plurality of types of image output apparatuses.

2. The information processing apparatus of claim 1, wherein the circuitry is configured to,
    acquire operation region information indicating a position of an operation region set in a total image-outputting area of the one of the plurality of types of image output apparatuses,
    set the image placement region in the total image-outputting area without overlapping with the operation region defined by the operation region information,
    reduce a size of the image data to generate a size-reduced image that fits within a size of the image placement region set for the one of the plurality of types of image output apparatuses, and
    generate the output image by placing the size-reduced image within the image placement region set for the one of the plurality of types of image output apparatuses.

3. The information processing apparatus of claim 2, wherein when the circuitry is configured to,
    generate the output image by placing the size-reduced image within the image placement region,
    set a marginal region where the size-reduced image is not placed at periphery of the image placement region, and
    set a monochrome image for the marginal region.

4. The information processing apparatus of claim 2, wherein
    a memory stores type information indicating the type of the one of the plurality of types of image output apparatuses and the operation region information of the one of the plurality of types of image output apparatuses in association with each other as an operation region information management table, and
    the circuitry is configured to,
      acquire the type information from the one of the plurality of types of image output apparatuses, and
      acquire the operation region information associated to the type information of the one of the plurality of types of image output apparatuses from the operation region information management table stored in the memory.

5. The information processing apparatus of claim 2, wherein the circuitry is configured to,
    set a blank for the image,
    add bibliographic information in the blank, and reduce a size of the image added with the bibliographic information in the blank to generate the size-reduced image.

6. The information processing apparatus of claim 2, wherein when the circuitry receives two or more images, the circuitry is configured to,
  combine the two or more images to generate a combined image, and
  reduce a size of the combined image to generate the size-reduced image that fits within the size of the image placement region set for the one of the plurality of types of image output apparatuses.

7. The information processing apparatus of claim 2, wherein when the circuitry receives two or more images, the circuitry is configured to,
  set a blank for each of the two or more images,
  add bibliographic information in the blank set for each of the two or more images,
  combine the two or more images added with the bibliographic information in the blank set for each of the two or more images as a combined image, and
  reduce a size of the combined image to generate a size-reduced combined image that fits within the size of the image placement region set for the one of the plurality of types of image output apparatuses.

8. The information processing apparatus of claim 1, wherein when the circuitry receives image data of a plurality of images, the circuitry is configured to set a position of each of the plurality of images in the image placement region of the one of the plurality of types of image output apparatuses based on an orientation and a size of each of the plurality of images.

9. The information processing apparatus of claim 8, wherein the circuitry is configured to set the position of each of the plurality of images in the image placement region of the one of the plurality of types of image output apparatuses based on a ratio of a size of the plurality of images with respect to a size of the image placement region.

10. The information processing apparatus of claim 9, wherein the circuitry is configured to set the position of each of the plurality of images using a layout that the size of the plurality of images has the greatest ratio with respect to the size of the image placement region of the one of the plurality of types of image output apparatuses when generating the output image.

11. The information processing apparatus of claim 1, wherein the circuitry is configured to generate the output image by adjusting the size of the image data based on the image data and the information of the image placement region such that the output image fits within the image placement region of the one of the plurality of types of image output apparatuses.

12. The information processing apparatus of claim 1, wherein the image data is a picture including a plurality of pixels, and the circuitry generates the output image by adjusting the size of the picture based on the image data and the information of the image placement region.

13. The information processing apparatus of claim 1, wherein the information processing apparatus generates the output image after the selection of the image data to output such that the output image is generated in real time after the selection of the image data to output.

14. A method of operating an information processing apparatus, the information processing apparatus connectable with a plurality of types of image output apparatuses via a network, the method comprising:
  receiving a selection of image data to output;
  transmitting, over the network, an acquisition request of apparatus type information from one of the plurality of types of the image output apparatuses;
  acquiring, from the one of the plurality of types of the image output apparatuses, information of an image placement region of the one of the plurality of types of image output apparatuses in response to the acquisition request, the image placement region being variable depending on a type of the image output apparatuses;
  generating an output image by adjusting a size of the image data within the image placement region based on the image data and the information of the image placement region acquired from the one of the plurality of types of the image output apparatuses such that the information processing apparatus generates the output image after the selection of the image data to output; and
  transmitting, over the network, the output image to the one of the plurality of types of image output apparatuses.

15. The method of claim 14, wherein the generating generates the output image by adjusting the size of the image data based on the image data and the information of the image placement region such that the output image fits within the image placement region of the one of the plurality of types of image output apparatuses.

16. An image output system comprising:
  an information processing apparatus connectable with a plurality of types of image output apparatuses via a network, the information processing apparatus including circuitry configured to,
    receive a selection of image data to output,
    transmit, over the network, an acquisition request of apparatus type information from one of the plurality of types of the image output apparatuses,
    acquire, from the one of the plurality of types of the image output apparatuses, information of an image placement region of the one of the plurality of types of image output apparatuses in response to the acquisition request, the image placement region being variable depending on a type of the image output apparatuses,
    generate an output image by adjusting a size of the image data within the image placement region based on the image data and the information of the image placement region acquired from the one of the plurality of types of the image output apparatuses such that the information processing apparatus generates the output image after the selection of the image data to output, and
    transmit, over the network, the output image to the one of the plurality of types of image output apparatuses.

17. The image output system of claim 16, further comprising:
  the one of the plurality of types of image output apparatuses including circuitry configured to,
    transmit information indicating the type of the one of the plurality of types of image output apparatuses to the information processing apparatus in response to the acquisition request of apparatus type information from the information processing apparatus, and
    output the output image received from the information processing apparatus.

18. The image output system of claim 16, wherein the circuitry is configured to generate the output image by adjusting the size of the image data based on the image data and the information of the image placement region such that the output image fits within the image placement region of the one of the plurality of types of image output apparatuses.

\* \* \* \* \*